(12) United States Patent
Spriggs et al.

(10) Patent No.: US 6,421,571 B1
(45) Date of Patent: Jul. 16, 2002

(54) INDUSTRIAL PLANT ASSET MANAGEMENT SYSTEM: APPARATUS AND METHOD

(75) Inventors: Bob Spriggs, Gardnerville; Bob Hayashida, Stateline; Ken Ceglia, Gardnerville; Diana Seymour, Carson City; Mike Peden, Gardnerville; Paul Richetta, Gardnerville; Matt Anderson, Gardnerville; Rich Bennington, Minden; Daryl Frogget, Gardnersville; Scott Roby, Gardnerville; Mark Jensen, Carson City, all of NV (US)

(73) Assignee: Bently Nevada Corporation, Minden, NE (US)

( * ) Notice: Subject to any disclaimer, the term of this patent is extended or adjusted under 35 U.S.C. 154(b) by 0 days.

(21) Appl. No.: 09/515,529

(22) Filed: Feb. 29, 2000

(51) Int. Cl.7 .............................................. G05B 11/01
(52) U.S. Cl. ........................... 700/17; 700/83; 345/113
(58) Field of Search ............................. 700/83, 86, 12, 700/17, 9, 18, 79, 169, 21, 26; 345/113, 434; 702/173, 45; 706/11, 60

(56) References Cited

U.S. PATENT DOCUMENTS

| | | | |
|---|---|---|---|
| 4,399,513 A | 8/1983 | Sullivan et al. ............. 703/189 |
| 4,413,314 A | 11/1983 | Slater et al. .................. 700/83 |
| RE31,750 E | 11/1984 | Morrow ........................ 714/47 |
| 4,644,479 A | 2/1987 | Kemper et al. ............... 706/50 |
| 4,803,039 A | 2/1989 | Impink, Jr. et al. ........... 706/57 |
| 4,872,121 A | 10/1989 | Chan et al. ................. 702/184 |
| 4,985,857 A | 1/1991 | Bajpai et al. ................ 707/530 |
| 5,202,828 A | 4/1993 | Vertelney et al. ........... 376/251 |
| 5,291,416 A | 3/1994 | Hutchins ..................... 700/174 |
| 5,311,562 A | 5/1994 | Palusamy et al. ............. 700/83 |
| 5,559,691 A | 9/1996 | Monta et al. ................. 702/56 |
| 5,602,757 A | 2/1997 | Haseley et al. ............ 73/865.9 |
| 5,623,109 A | 4/1997 | Uchida et al. ................ 700/83 |
| 5,631,825 A * | 5/1997 | Van weele et al. ......... 364/188 |
| 5,675,752 A * | 10/1997 | Scott et al. ................. 345/866 |
| 5,719,796 A | 2/1998 | Chen .......................... 700/108 |
| 5,748,881 A | 5/1998 | Lewis et al. ................... 714/47 |
| 5,822,743 A | 10/1998 | Gupta et al. ................... 706/50 |
| 5,826,251 A | 10/1998 | Kiendl ......................... 706/52 |
| 5,838,588 A | 11/1998 | Santoso et al. ............. 700/287 |
| 5,854,994 A | 12/1998 | Canada et al. .............. 700/169 |
| 5,859,885 A | 1/1999 | Rusnica et al. ............. 376/259 |
| 5,870,698 A | 2/1999 | Riedel et al. ................ 702/182 |
| 5,877,961 A | 3/1999 | Moore ........................ 702/182 |
| 5,899,990 A | 5/1999 | Maritzen et al. ............ 700/180 |
| 5,905,985 A | 5/1999 | Malloy et al. ............... 707/100 |
| 5,905,989 A | 5/1999 | Biggs ............................ 707/4 |
| 5,918,225 A | 6/1999 | White et al. ............. 707/104.1 |
| 5,963,884 A | 10/1999 | Billington et al. ............. 702/56 |
| 5,995,916 A * | 11/1999 | Nixon ......................... 702/182 |

* cited by examiner

Primary Examiner—Leo Picard
Assistant Examiner—Kidesi Bahta
(74) Attorney, Agent, or Firm—Dennis DeBoo

(57) ABSTRACT

An industrial plant asset management system comprising of a synchronized multiple view graphical user interface combining simultaneous real time and database display capability, a database including a knowledge manager and having input and output interfaces, a normalizing data acquisition module with real time and database interfaces, and a variety of device dependent data collector modules with associated signal conditioning and processing devices for providing an environment for development and deployment of visual models for monitoring plant assets.

26 Claims, 20 Drawing Sheets

INDUSTRIAL PLANT ASSET MANAGEMENT SYSTEM: APPARATUS AND METHOD

FIELD OF THE INVENTION

The instant invention relates generally to asset management systems and, in particular, to an industrial plant asset management system including a unified display environment and a common database structure for protecting and managing industrial plant assets including a multifarious grouping of machinery and processes.

BACKGROUND OF THE INVENTION

Currently, industrial plants employ a multiplicity of "stand-alone" systems that include multiple computers, operating systems, applications and networks for accomplishing the same basic problem: protecting and managing plant assets. This methodology of employing one system for large critical machines another for general purpose machines, one for off-line another for on-line, one for vibration, another for oil analysis, et cetera, is in the least undesirable, and has led to significant costs in purchasing and maintaining these assorted systems. For example, high capital, integration, system maintenance, and training costs are but a few of the significant costs associated with these multiple "stand-alone" systems.

Integrating a multiplicity of different systems is still less than ideal because of the costs associated with performing the integration, training users on multiple systems, and maintaining multiple software packages. Adding to the integration costs are the significant costs associated with engineering and sustaining these multiple software packages. Training sales and service people on all of these multiple software packages also augments costs.

For the foregoing reasons, there is a need to reduce the number of computers and operating systems required for protecting and managing plant assets in order to lower capital cost and in order to reduce the traditional requirements for both expertise and human resources necessary to integrate and maintain these systems. Additionally, there is a need to reduce system installation cost and to reduce integration and maintenance costs prevalent in traditional prior art systems. Furthermore, there is a need to provide a system that substantially eliminates the need to configure the same device or point in multiple applications thereby resulting in a quick, easy, and less costly configuration.

SUMMARY OF THE INVENTION

The instant invention recognizes the shortcomings of the known prior art and is distinguished thereover in a multiplicity of ways. Moreover, the instant invention provides an industrial plant asset system that is revolutionary from both a technology standpoint and from a business standpoint. One of the starkest differentiations that the instant invention enjoys over the known prior art involves the fact that the instant invention is not a stand-alone system that merely manages a single category of machinery nor is it an integrated system that employs multiple systems and software packages for monitoring different categories of machinery. In stark contrast, the instant invention provides a unique system that, inter alia, integrates a host of condition-monitoring devices, technologies and third party data sources into a single system that addresses all machinery types and modes of data acquisition with a single unified display application and using a common open database. Therefore, the instant invention eliminates the shortcomings of the known prior art by reducing the number of computers and operating systems required for protecting and managing plant assets. Hence, capital costs are lowered and the traditional requirement for both expertise and human resources necessary to integrate and maintain prior systems is reduced. Additionally, the instant invention reduces installation, integration and maintenance costs associated with these prior systems. Moreover, the instant invention provides a system that substantially eliminates the need to configure the same device or point in multiple applications thereby resulting in a quick, easy, and less costly system configuration.

The instant invention integrates, inter alia, on-line continuous management for critical machinery, scanning management of less critical machinery, off-line management of critical machinery and off-line management of less critical machinery into a single system, which includes performance monitoring, and decision support. Furthermore, the system is designed to provide extensive external communication capabilities. These capabilities are not limited to interfaces with other condition monitoring devices and systems, but instead extend to plant control and automation systems. This allows the user to incorporate machinery asset condition information in operational and maintenance systems, and to incorporate many types of information relating to machinery asset conditions, regardless of the source. This capability greatly enhances the effectiveness and value of the system.

As a result, the system is capable of correlating information from multiple sources that allows timely, operational decisions on machinery condition that consider both the machinery and the surrounding process conditions/constraints. Thus, the system provides fewer and less severe failures, better production availability, maintenance cost reductions, and the potential for increased production revenues. This ability is provided by the instant invention gathering information from multiple information sources within the plant control and automation systems and synchronously integrating the information onto a single unified display environment.

In one preferred form, the instant invention is comprised of a data acquisition module, a display module, a database module, and utility modules. These modules can reside on a single computer or on a plurality of independent computers that interact via a network.

The data acquisition module is in operative communication with a plurality of data acquisition devices for collecting data engendered from a plurality of transducer/sensors strategically placed at locations throughout an enterprise including machine and process measurement points. The data acquisition module processes the collected data and interfaces with and serves data to both the database module and the display module for data storage and real-time data display. Additionally, the data acquisition module may bring in data from distributed control systems (DCSs) and Historians (databases that include historical plant asset information and events).

The display module is in operative communication with the data acquisition module, the database module and the utility modules and includes a unified graphical user interface for viewing data from all of these modules. The graphical user interface is unique in that it, inter alia, provides synchronized multiple views of machine and instrument assets as well as diagnostic data and plot formats required for machinery and process diagnostics.

The database module is in operative communication with the data acquisition module, the display module and the utility modules and includes a historical/machine database and a configuration database. The historical/machine database is employed for storing, inter alia, historical enterprise asset data and collected machine and process data while the configuration database is employed for storing, inter alia, asset configurations including alarm parameters.

The utility modules are in operative communication with the data acquisition module, the database module and the display module and include modules that increase the communications abilities and functionality of the system. One important utility module is a configuration module. The configuration module allows a user to configure, via the unified graphical user interface, an enterprise and associated physical assets including asset monitoring instrumentation, asset transducers/sensors and associated properties including alarming.

OBJECTS OF THE INVENTION

Accordingly, a primary object of the instant invention is to provide a new, novel and useful industrial plant asset management system: apparatus and method.

A further object of the instant invention is to provide the industrial plant asset management system as characterized above which includes a unified display environment and a common database structure for protecting and managing industrial plant assets.

Another further object of the instant invention is to provide an industrial plant asset management system as characterized above which is modular in design and based on a client server architecture that allows the user to configure the system as centralized, distributed, or any combination of the two.

Another further object of the instant invention is to provide an industrial plant asset management system as characterized above which includes Local or Wide Area Network (LAN or WAN) support for implementing the system in a manner that takes advantage of existing network structures and philosophy for lowering installation and system maintenance costs.

Another further object of the instant invention is to provide an industrial plant asset management system as characterized above which includes remote access to obtain remote services for troubleshooting both instrument and machinery problems for providing expedited problem resolution and lowered cost of services.

Another further object of the instant invention is to provide the unified display environment as characterized above which includes a machinery management display that provides a unified interface to machine asset and condition information as well as the system's instrument assets and transducer or sensor assets thereby enabling the user to view the enterprise as a whole and navigate to a specific point or parameter quickly and easily.

Another further object of the instant invention is to provide the unified display environment as characterized above which provides access to machinery and instrument asset information, such as drawings and maintenance records or reports.

Another further object of the instant invention is to provide the unified display environment as characterized above which reduces user-training time and increases effectiveness as its use becomes more intuitive.

Another further object of the instant invention is to provide the unified display environment as characterized above which allows the user to correlate information from multiple applications and sources into a single unified view thereby expediting problem resolution during the diagnostics process.

Another further object of the instant invention is to provide an industrial plant asset management system as characterized above which incorporates multiple condition monitoring technologies as well as on-line and off-line data collection.

Another further object of the instant invention is to provide an industrial plant asset management system as characterized above which includes an open architecture for taking advantage of the many utilities and tools available for today's operating systems, importing and exporting information using industry standard methods, using application components in third-party systems, and customizing the system to specific needs without the need for complex configuration and integration.

Another further object of the instant invention is to provide an industrial plant asset management system as characterized above which includes parametric alarming in addition to the traditional software alarms of prior art systems thereby allowing the user to set alarms based on different modes of operation, including process conditions.

Another object of the instant invention is to provide parametric alarming as characterized above, for providing the user with the ability to customize system alarms and create simple or very complex alarming schemes.

Another object of the instant invention is to provide parametric alarming as characterized above, which includes generating internal software alarms for an alarm list, for creating exportable alarms for third-party interfaces, and for initiating data collection for machinery monitored on-line.

Yet another further object of the instant invention is to provide an industrial plant asset management system as characterized above which basis maintenance activities on specific alarms, machinery fault identification and information that is ready for use without further interpretation or analysis rather than simply displaying data that requires further interpretation and analysis.

Still yet another further object of the instant invention is to provide an industrial plant asset management system as characterized above which can communicate with portable data collectors for receiving an upload of data therefrom and generating a new route comprised of points from a first route (the uploaded route) which were in alarm.

These and other objects and advantages will be made manifest when considering the following detailed specification when taken in conjunction with the appended drawing figures.

DESCRIPTION OF PREFERRED EMBODIMENTS

Figure 1:
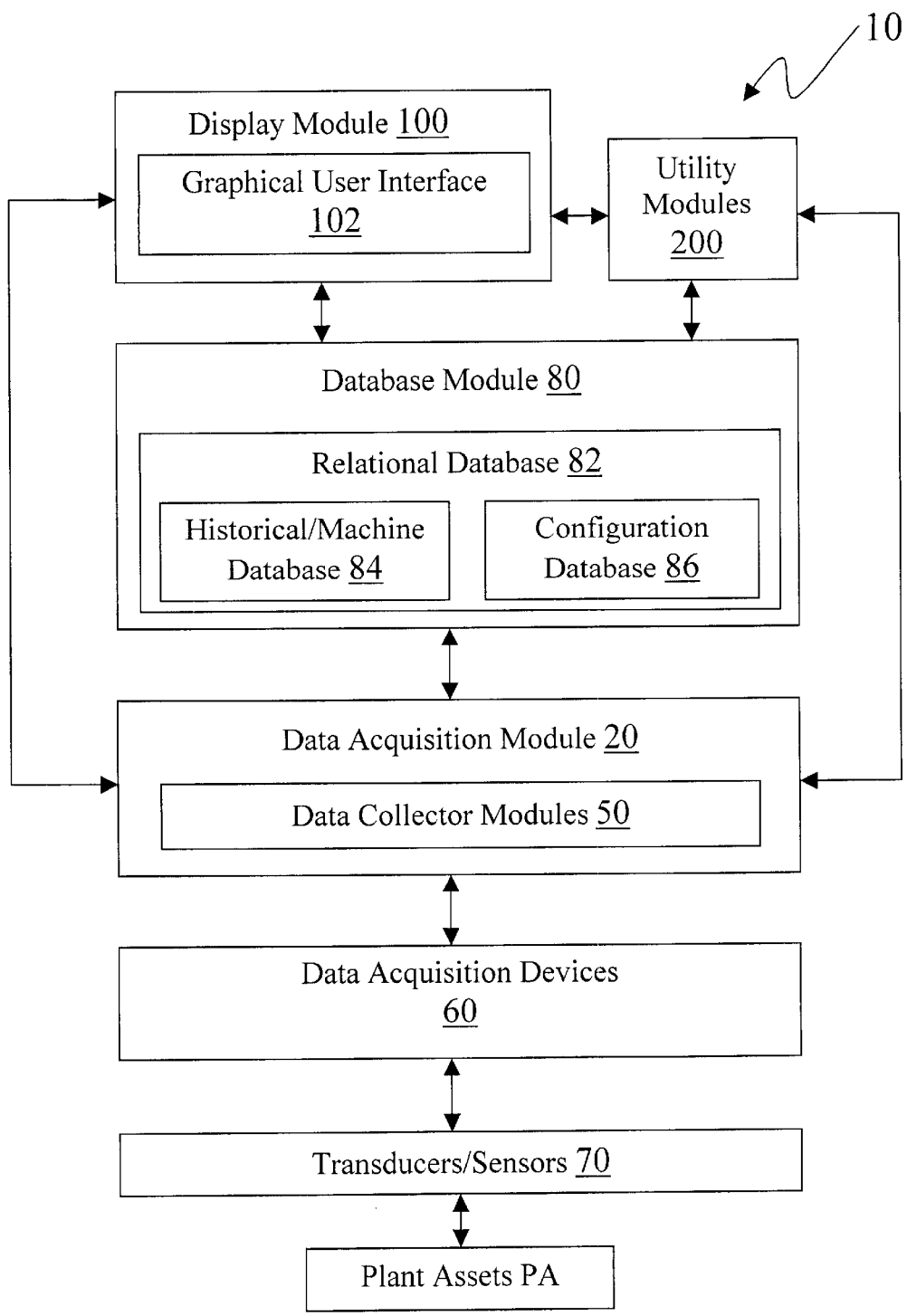
FIG. 1 is a schematic view of the industrial plant asset management system according to the instant invention and including a unified graphical user interface and a common database structure for pro land managing industrial plant assets.

Considering the drawings, wherein like reference numerals denote like parts throughout the various drawing figures, reference numeral 10 is directed to the industrial plant asset management system according to the instant invention.

In its essence, and referring to the FIG. 1, the system 10 is modular and scalable in design and can be apportioned to include four primary module groups. These module groups can reside on a single computer (process device) or on a plurality of independent computers that interact via a network. The groupings can include a data acquisition module 20, a database module 80, a display module 100 including a unified graphical user interface 102 or a unified GUI 102, and a utilities module 200.

The data acquisition module 20 includes a software module that can reside on one more data acquisition computers or clients and acts as, inter alia, a data buffer that serves data to both the database module 80 and to the display module 100 for data storage and for real-time data display, respectively. The data acquisition module 20 includes a plurality of different data collector modules 50 that act as an interface to data acquisition devices or systems 60, which include both hardware acquisition devices and software applications. The data acquisition devices 60 are operatively coupled to transducers/sensors 70 for collecting signals from asset locations including measurement points.

The database module 80 includes a relational database 82 that is a repository for all configuration information as well as data collected by data acquisition devices 60. The database module 80 can reside on a server, for example, a Microsoft® SQL Server. Furthermore, the database 82 can include a knowledge manager such as the one disclosed in the commonly assigned U.S. Pat. No. 5,905,989, filed Nov. 27, 1996, of Biggs, entitled "Knowledge Manager Relying on a Hierarchical Default Expert System: Apparatus and Method," which is hereby incorporated by reference in its entirety.

The display module 100 includes a software module that displays data in the database module 80 or in the data acquisition module 20 on, for example, one or more computers or display clients via the unified graphical user interface 102. Communication with the data acquisition module 20 is what permits the real-time display of data such as orbits during a machinery start-up. The display module 100 can be viewed as having two levels of display: basic navigation/operator display and full machinery management display.

The navigation/operator level provides a navigational environment to view an enterprise (a logical arrangement of machinery assets within a plant), a unit, a machine, a point, et cetera, as well as plot types associated with data sets as supplied by one or more data acquisition devices 60 such as a machinery protection system. This can be viewed as a lower level user interface to the external data acquisition devices 60 that serves those who want to know the status of the machinery and system instruments and who want to use alarms and monitored values as part of a machinery protection philosophy requiring operator intervention.

The full machinery management display provides the navigation and static data set of basic navigation with the addition of all diagnostic data and plot formats required for machinery diagnostics including dynamic and startup/shutdown data.

The utilities module 200 includes software modules that increase the communications abilities and functionality of the system 10. These utilities preferably include a configuration module 202 including configuration tools, data exporter modules 300 including custom interface modules, and system extender (SE) modules 302 (please see FIG. 3).

Configuration tools are used to configure all data acquisition devices including instrumentation, construct machine train diagrams, and define the enterprise (i.e., the logical arrangement of machinery assets within the plant). Configuration tools and configuration information existing in the system 10 is preferably available for system extenders as well.

Data exporter modules 300 are interfaces that allow the system 10 to communicate with control and automation systems including third party control and automation systems. These exporter modules 300 can include the following interfaces: an object linking embedding (OLE) interface for process control, for example OLE for process control (OPC), a Dynamic Data Exchange (DDE) interface, and a Standard Query Language (SQL) interface. Custom Interfaces are interfaces to select third-party applications (i.e., Human Machine Interface (HMI), Historians, Computerized Maintenance Management System (CMMS), etc.)

For example, an exporter module can interface between the data acquisition module 20 and a client user. Similar to the display client, each exporter can request real time data from the data acquisition module 20 or stored data form the database 82. The exporter has two main layers. One layer communicates with the modules of the system 10 to retrieve data. The other layer converts that information into the protocol requested by the user. Network Dynamic Data Exchange (NetDDE) and OPC are examples of protocols that the exporter preferably supports.

The system extender (SE) modules extend the functionality of the system 10 and can include data importers such as OLE for Process Control (OPC), Dynamic Data Exchange (DDE), Standard Query Language (SQL), and machinery information management open system alliance (MIMOSA). Additionally, the system extenders can include decision support modules, performance monitoring modules, balancing modules, alignment modules, oil analysis modules, rotor modeling modules, rolling element bearing database modules, and document management modules.

Figure 2:
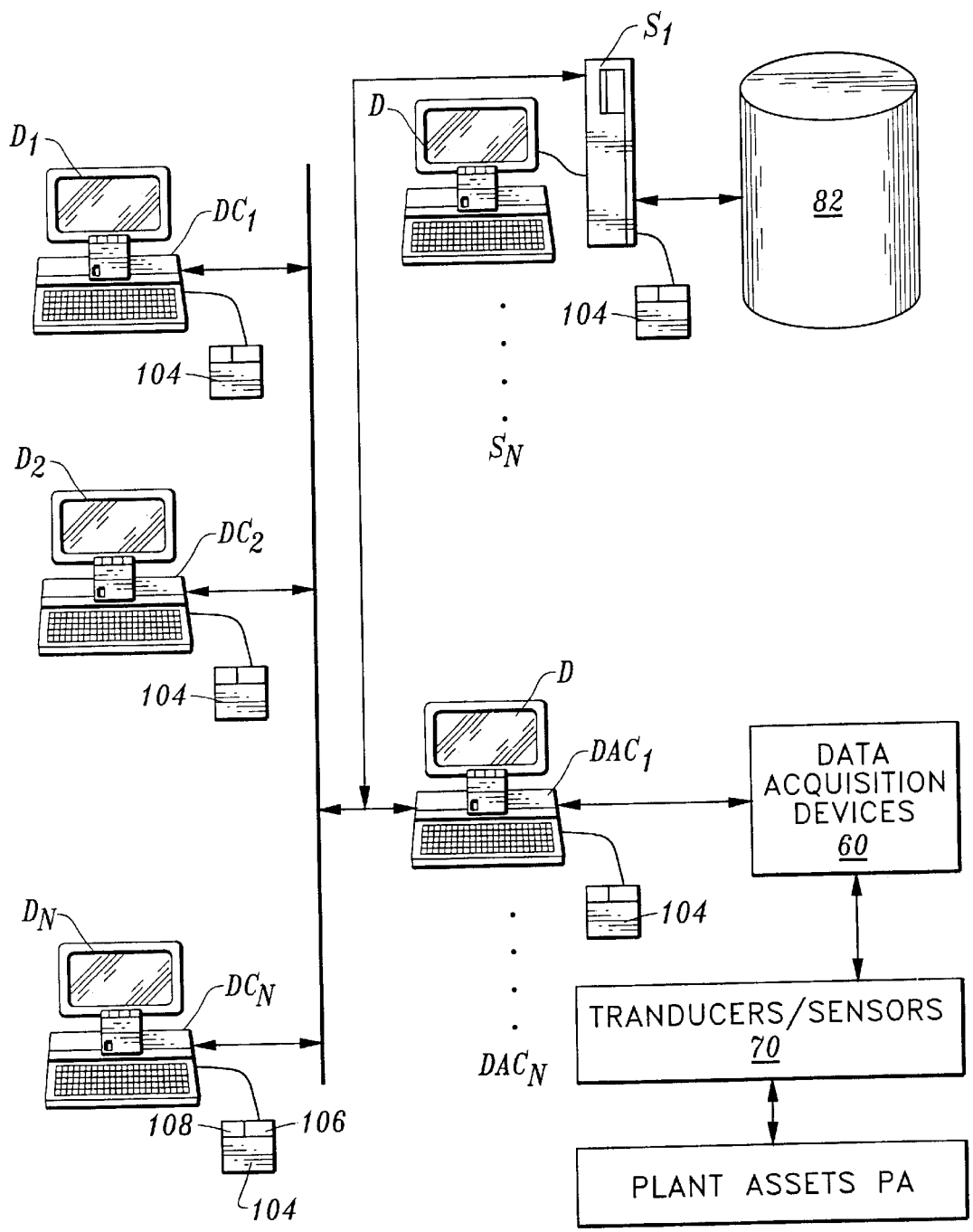
FIG. 2 is a simplified schematic of one example of client/server network architecture according to theft invention.

More specifically, and referring FIG. 2, a simplified schematic of one example of the client/server network architecture according to the instant invention is shown wherein the database module 80 resides on one or more servers $S_1, S_2, \ldots S_N$, the data acquisition module 20 resides on one or more data acquisition nodes or computers $DAC_1$, $DAC_2, \ldots DAC_N$, and the display modules 100 resides on one or more display clients or computers $DC_1$, $DC_2$, ... $DC_N$. Thus, the system 10 can be based on a client/server network architecture employing at least one server, one or more computers, network controller cards, hub(s) and, for example, an Ethernet protocol communications link for configuring the system 10 as a centralized network, a distributed network, or any combination of the two as known to those having ordinary skill in the art, and informed by the instant disclosure. Additionally, the system 10 can be constructed as a wide area network (WAN) for managing a plurality of enterprises.

Display Module and Associated Display Devices

The display module 100 is in operative communications with both the data acquisition module 20 and the database module 80 via one or more data acquisition nodes $DAC_N$ and one or more servers $S_N$, respectively. Display module 100 employs the unified graphical user interface 102 for displaying data from both these modules on one or more display devices $D_1, D_2, \ldots D_N$ respectively associated with the one or more display clients $DC_1, DC_2, \ldots DC_N$. Each display client includes an input or pointing device (e.g., a touch screen, a mouse, a touch pad, a keypad, a light pen, voice actuation, etc.) so that the user can navigate a "pointer" about the graphical user interface 102 and interact with information being viewed. Note that the instant invention is not limited by the use of any one particular input device used for interacting with the graphical user interface 102. Furthermore, the functionality of any one particular pointing device is typically configurable by the user and may vary from one pointing device to another.

Notwithstanding, the mouse device is one exemplary input device with wide user familiarity. Thus, the mouse device 104 will be employed in the description infra as the input device for navigating a display pointer about the graphical user interface 102. The mouse 104 includes a "right" actuation device or button 106 and a "left" actuation device or button 108. The left mouse button 108 is generally used for, inter alia, selecting, dragging and opening an object when actuated or clicked on that object. Similarly, the right mouse button 106 is generally used for, inter alia, opening one or more menus and dialog boxes associated with an object when actuated or clicked on that object. Thus, clicking or actuating the right mouse button will hereinafter be referred to as a right click and clicking or actuating the left mouse button will hereinafter be referred to as left click.

Data Acquisition Module

Figure 3:
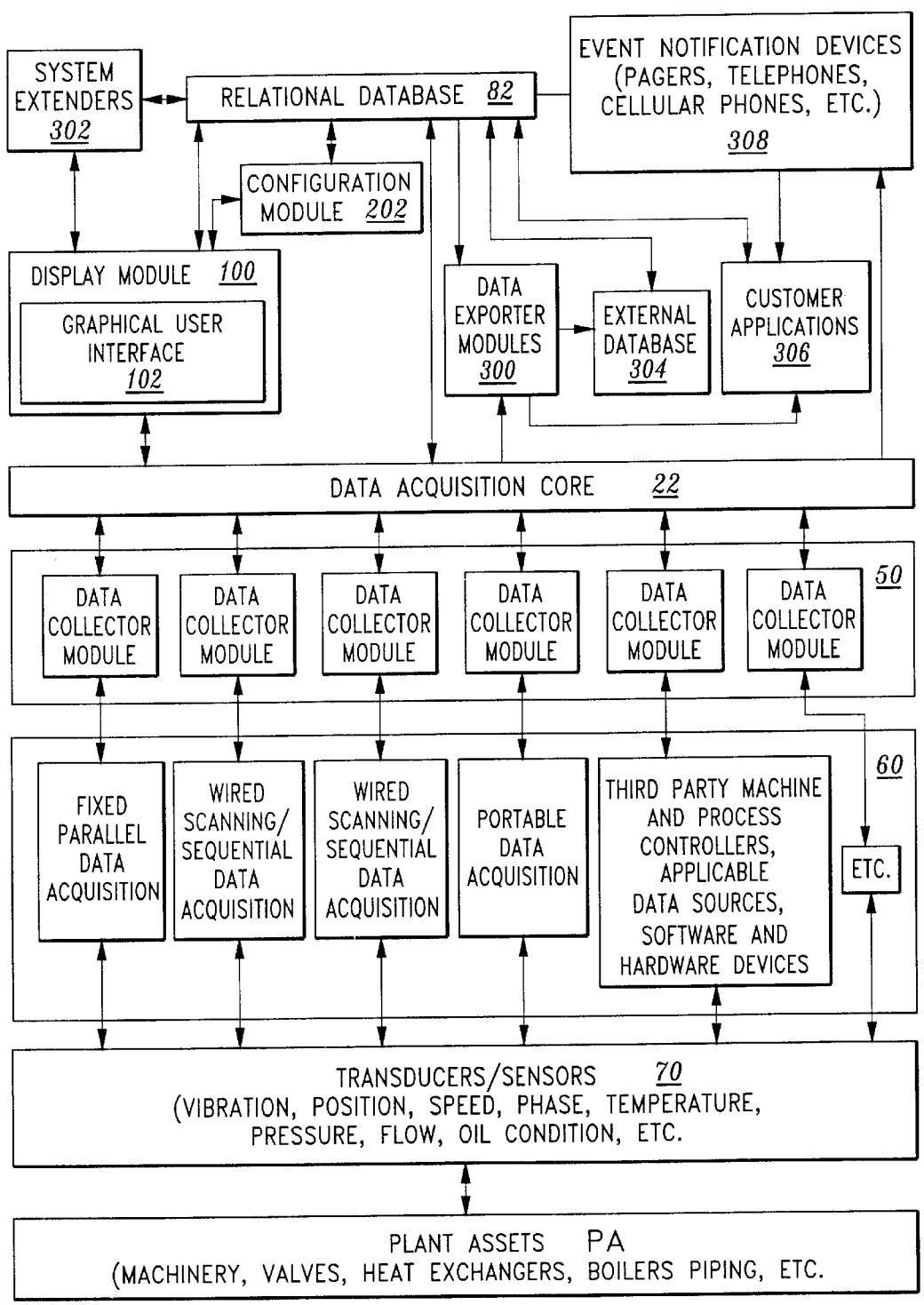
FIG. 3 is a more detailed schematic view of that which is shown in FIG. 1.

Referring now to FIG. 3, the data acquisition module 20 can be apportioned into a plurality of data collector modules 50, a data acquisition core 22 and into one or more exporter modules 300.

Data Collector Modules

The data collector modules 50 are the interfaces between the data acquisition devices 60 and the data acquisition core 22. These modules 50 convert various known digital protocols and data streams received from the data acquisition devices 60 into a standard input for the data acquisition core 22 via associated signal conditioning and processing means. Each of the data collector modules 50 employs a specific protocol for collecting data from each of the specific data acquisition devices 60 (e.g., asset management instruments) that are then connected to a variety of asset management transducers/sensors 70 including vibration, temperature, pressure, flow, optical, torque, position, and others for providing bi-directional communication. Thus, data can be received from and transmitted to each of the data acquisition devices 60 in the form of sensed data (data received), and configuration information and commands (data transmitted). The data collector modules 50 can also connect third party instrumentation systems, monitoring systems, machine controllers, process controllers, and field devices to the data acquisition module 20.

The data collector modules 50 preferably include modules for collecting data from fixed parallel devices including online continuous devices, from wired and wireless scanning/sequential devices including online scanning or multiplexing devices, from off-line diagnostic and surveillance devices including portable data collectors, from condition monitoring devices such as oil analysis, from processes devices, and from third party devices which can include machinery protection devices, machine and process controllers, applicable data sources, et cetera. A portable data collector module, a TDXnet® data collector module (communications processor) manufactured by Bently Nevada Corporation located in Minden, Nev., and an OPC data collector module are specific examples of data collector modules 50 for specific data acquisition devices 60. These modules collect the data via each of the devices known supported protocol and convert it to a standard input that is received by the core data acquisition module 22 for further processing.

Typically, online continuous devices or machinery protection systems are employed for critical machinery (i.e., machinery that represents such large business risks including economic, safety, government compliance, or production interruption that mechanical failures cannot be tolerated). Wired and/or wireless online scanning or multiplexing devices are typically employed for essential machinery (i.e., machinery that can cause partial production interruption or some other form of business loss if it fails, does not run, or runs at a reduced capacity) and for balance of plant machinery (other less critical plant machinery). Off-line diagnostic devices and portable surveillance/diagnostics devices are characteristically employed for essential machinery or balance of plant machinery, or when supplemental measurements are necessary on machines addressed by continuous or scanning data acquisition devices or systems. Thus, different data collector modules 50 simultaneously interface with continuous on-line monitoring devices, periodic on-line scanning or multiplexing monitoring devices, off-line diagnostic devices, portable surveillance/diagnostics devices, process devices and other conditioning monitoring devices for acquiring data from a multiplicity of measurement points throughout an enterprise.

Data Acquisition Core

Figure 4:
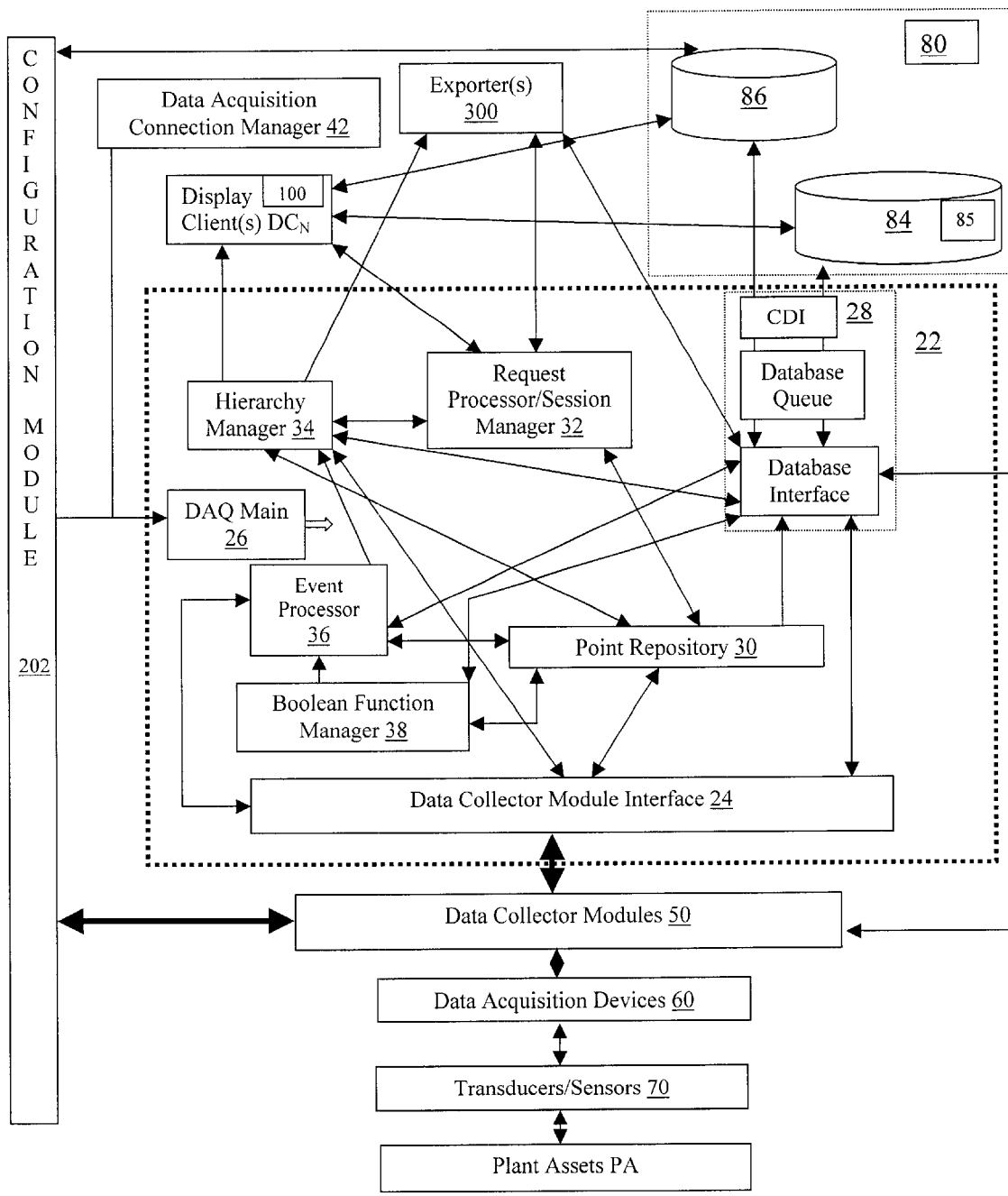
FIG. 4 a schematic view of, inter alia, a data acquisition core according to the instant invention.

Referring now to FIG. 4, the data acquisition core module 22 provides a data-conditioning layer between the physical world and both the database module 80 and the display module 100. Uniquely, the data acquisition core 22 includes means for real time interfacing with both the database module 80 and the display module 100 for providing real time export and real time display of data. The data acquisition core 22 is configuration sensitive thereby providing proper scaling for the connected information flows. It also provides alarming functions for simple and parametric alarms.

Data acquisition core module 22 is comprised of a data collector module interface 24, a data acquisition main module 26 (DAQ Main 26), a database interface/queue module 28, a point repository module 30, a request processor/session manager module 32 (real time interface), a hierarchy manager module 34, an event processor module 36, and a Boolean function manger module 38.

The data collector interface module 24 provides the interface between the core data acquisition module 22 and the plurality of data collector modules 50. For the most part, the other core modules do not know where the data is coming from. This is because the data collector interface module 24 substantially standardizes the interface to the data collector modules 50.

The data acquisition main module 26 controls the starting and stopping of the other modules of the core 22 and may run as a service (the module is started when the system boots). Additionally, the data acquisition main module 26 is the module that is signaled by a configuration module (please see FIG. 9) of the system 10 when configuration changes are made to the system 10. The data acquisition main module 26 passes this information to the other core modules so that they can adjust to the new configuration. For example, a point repository module 30, to be discussed hereinbelow, is updated when the user changes alarm configurations. Furthermore, the data acquisition main module 26 handles the communication with a data acquisition connection manager 42.

The database interface/queue module 28 is the interface to the relational database 82 including the configuration database 86 and to the historical/machine database 84. Each of the data acquisition modules 20 that needs information from either database or needs to write information to either database uses this module to complete this operation.

The point repository module 30 is a repository of point data (data collected from individual transducers including sensors) and status. This module receives data collected by the hardware on a point basis and initiates alarming on the collected data. The point repository module then adjust the status on the points if an alarm is detected or if a point is no longer in alarm and then reports this status change to the historical/machine database 86 and to any clients requesting it.

The system 10 includes both hardware-generated alarms and software-generated alarms. Hardware-generated alarms are specific to and evaluated by each individual hardware device. The results of these evaluations are returned to the system 10 for processing and display. Generally, hardware-generated alarms include over and under alarms that the user sets for a specific instrumentation such as monitoring system via the configuration utility module 202 and/or configuration object 150 to be explained infra. In one form, the hardware-generated alarms include two levels of alarms: alert and danger.

The software-generated alarms of the system 10 are comprised of level alarms, in-band and out-of-band alarms, acceptance region alarms, spectral band alarms, and parametric alarms that can be set on one or more variables. The user via the configuration utility module 202 including the configuration object 150 determines how these are set. For example, the parametric alarms can be configured to accept data from multiple variables from multiple points. This way the alarm may be determined by the running condition of the machine not just by one variable exceeding a set point.

Specifically, level alarms are comprised of basic over and under level alarms. For example, a variable is in an over alarm condition if its value matches or exceeds an over setpoint and conversely, a variable is in an under alarm condition if its value matches or is below the under setpoint. In-band alarms are alarms that fall between two boundaries or setpoints. Thus, a variable is in an in-band alarm condition if its value is within two boundaries or setpoints thereby defining an in-band setpoint region. Out-of-band alarms are alarms that fall outside two boundaries or setpoints. Thus, a variable is in an out-of-band alarm condition if its value is outside the two boundaries or setpoints thereby defining an out-of-band setpoint region. Amplitude and phase regions that are in an "acceptable" region define the acceptance region alarms. Thus, if a vector value goes outside of this region, it will be in alarm. The "acceptable" region can be defined by the user or configured to predetermined default values. Spectral band alarms include full and single spectrum alarms. Parametric alarms are alarms that are defined by using Boolean logic to combine a variety of conditions into one event which is preferably assigned a severity. The types of conditions that can be used in a parametric event include measurement location statuses (e.g., Not Ok), measurement values (e.g., Direct Amplitude=5), date/time and schedules. As an example, IF (Direct Measurement is in a Level 1 Alarm) AND (Temperature>=500) AND (Time= 2:00 a.m.) Then "Possible Problem" Event occurred and will be logged to a system event List 85.

More specifically, and in one preferred form, each amplitude variable (e.g., Direct, 1×Amp, Gap) can be configured to have either four level alarms, or two in-band alarms, or two outof band alarms. Each phase variable (e.g., 1×Phase, 2×Phase) can be configured to have two out-of-band alarms. Each spectral band variable can be configured to have one level alarm. Each vector variable (e.g., 1×Amplitude/Phase) can have up to four acceptance region alarms. In addition, and as noted hereinabove, a variety of conditions on a variety of variables can be combined to provide parametric alarming.

In addition, the system 10 allows the user to define or configure a plurality of severity levels to each alarm. In one preferred form, there can be four configurable severity levels (1 through 4) and a severity level of zero (0). The zero severity level can mean that a variable, event or parametric value is acceptable while increasing levels mean that the variable, event or parametric value has an increasing severity. Typically, hardware generated alarms would normally have a higher severity level such as a severity level of three (3) or four (4), but this is totally configurable by the user. The user can also configure a color for each severity level. For example, the severity level zero (0) could be green, severity level two (1) blue, severity level two (2) yellow, severity level three (3) orange, and severity level four (4) red. The benefits of this concept is that assets can be quickly managed by providing visual feedback to the user, via the graphical user interface 102, of an alarm and the severity associated with that alarm so that appropriate action can be immediately initiated.

Preferably, alarm events are logged into the event list 85 and can be configured to drive other user-defined actions. Therefore, each of the alarm events (in addition to other events) can be used to drive different actions. E.g., if "Possible Problem" event occurs, then send email to operator.

Additionally, the alarm event is reported to any client viewing the data acquisition module who reported the alarm. The alarms are not the only thing reported. The severity level is also reported because that is what determines the color displayed on the unified graphical interface 102. Thus, this unique alarming that the system 10 performs is very flexible and can be configured to meet the user's needs.

Figure 5:
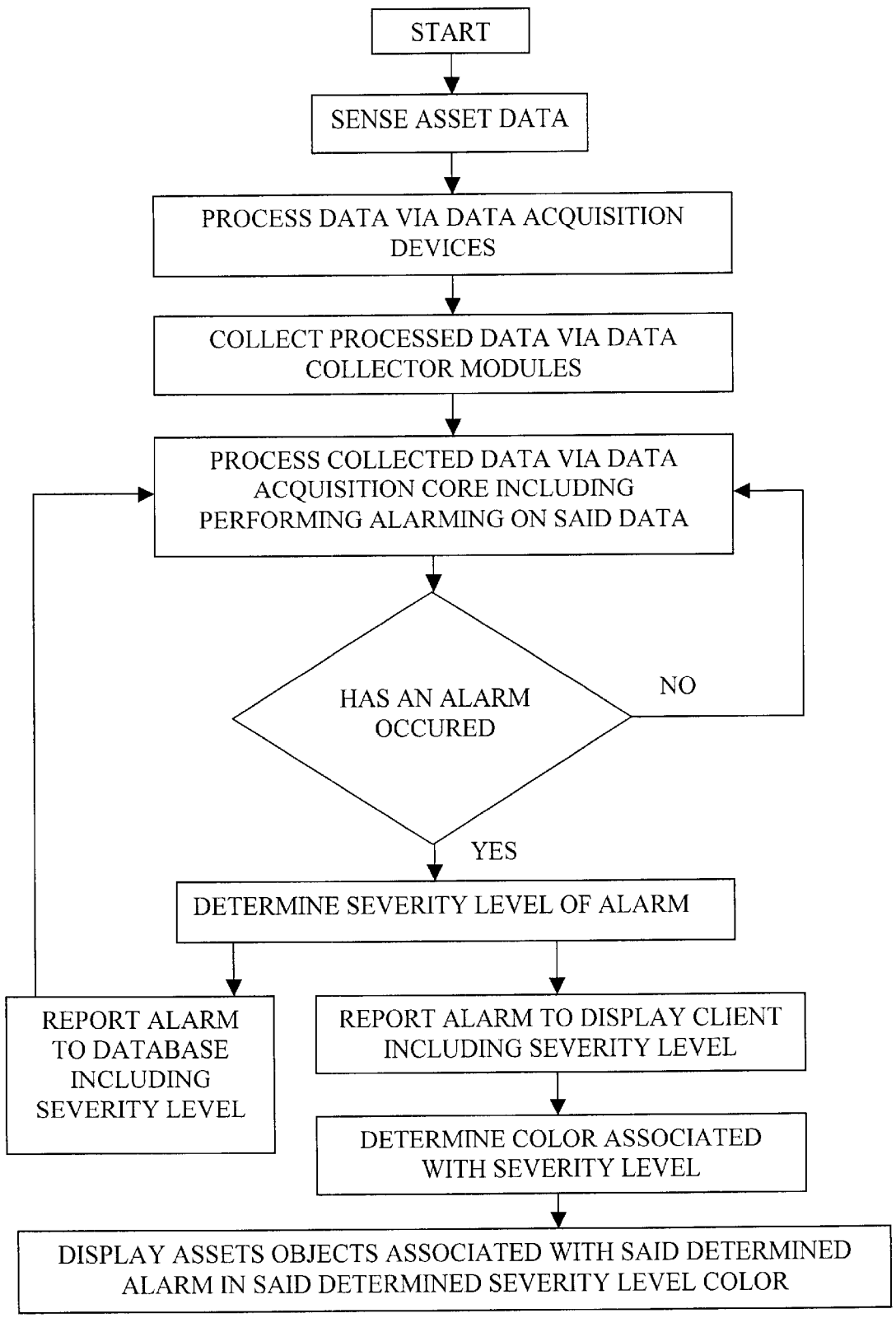
FIG. 5 is a flowchart view of an alarming process having severity levels according to the instant invention.

More specifically, and referring to FIG. 5, raw asset data is sensed by the transducers/sensors 70 and sent to respective data acquisition devices 60 for processing. The processed data is then collected by the data collector modules 50 and sent to the data acquisition core 22 for further processing including performing alarming on the collected data and determining severity levels of any alarms via point repository 30. The point repository 30 preferable reports, via a hierarchy manager 34 and request processor 32, the determination of an alarm to display clients that are monitoring the assets associated with the alarm and to any other display clients upon request. Each display clients $DC_N$ in turn determines the configurable color associated with each alarm and displays asset objects associated with each alarm in the respective determined severity level color.

Additionally, the point repository 30 preferable reports, via event processor 36 and database interface/queue module 28, any alarms to the historical/machine database 84 including reporting the respective severity levels.

Referring again to FIG. 4, the request processor/session manger module 32 is the interface to the display clients $DC_1$, $DC_2$, ... $DC_N$ for real time data display. This module allows display clients $DC_1$, $DC_2$, ... $DC_N$ to request that a session be set up and the module 32 then updates the display clients on a given interval. These sessions can return static data, dynamic data or asset status. This module is also the interface for one-time data collection requests such as reference (baseline) data collection.

Additionally, the request processor/session manger module 32 is the interface to the data exporter modules 300. In one form, the data exporter modules 300 can include an exporter module which includes two layers: a lower layer that requests data from the data acquisition core 22 or the database 82, depending on the request for real time or stored data, and a upper layer that takes the data and transforms it into a protocol requested by the customer application (please see FIG. 3).

The hierarchy manager 34 is the repository for all the hierarchies that have been configured in the system (hierarchy configuration is delineated in detail infra). They include enterprise, instrument and route hierarchies. Route hierarchies are associated with portable data collectors. The other modules of the data acquisition core 22 use this module 34 to retrieve hierarchy (parents and children) information for a given position in the hierarchy. This module also retains the status information for each level of the hierarchy. Thus, if any display client $DC_N$ needs to know the status for a given level, this module will fill the request. Thus, if the point repository 30 detects an alarm on an asset it can report this status to any display client $DC_N$ via the hierarchy manager 34 The display module 100 of the display client in turn tags or assigns the alarming asset object with a user configurable severity level color such that the alarming asset object is display on the unified GUI 102 with the severity level color tag. Additionally, the display module 100 looks at the severity of each level independently and assigns or tags each object that is branched to the alarming asset with the severity level color tag. Thus, a user can start from a level higher than the alarming asset object and follow a visual colored course or path from the higher level to the alarming asset object by drilling down the hierarchical tree structure to the alarming asset object.

The event processor module 36 controls the writing of events to the event list 85 of the system 10. Thus, if an alarm is detected (hardware or software) it is reported to this module and then put in the event list 85. This module also controls any actions that a user may want to put into action as a result of a given event. For example, if a software alarm is detected, a user may want more data to be collected on a specific machine train. That action will be configured and event processor module 36 will signal that collection to be carried out. Note that events are not restricted to alarms. Events may be, inter alia, changes in the running of a machine and actions can be configured that will accomplish something when these events occur.

The Boolean Function Manager module 38 controls any configured Boolean functions. Boolean functions include parametric alarms. If a Boolean function is triggered, the Boolean function manager module 38 signals the event processor module 36 that then carries out the configured actions.

The data acquisition module 20 further includes a data acquisition connection manager module 42 that is operatively coupled to the data acquisition core module 22 for providing an interface 102 for system data acquisition. With this module, the user can initiate and close the data acquisition program, stop and start the collecting of data, as well as view the running state of all the data acquisition stations in a plant. Thus, the user can control the data acquisition around the plant form a single computer with the data acquisition connection manager module 42.

Database

As mentioned above, the database interface/queue module 28 is the interface to the relational database 82 including databases 84 and 86. Thus, each of the data acquisition modules 20 that needs information from either database or needs to write information to either database uses this module to complete this operation.

Collected asset data can be compressed prior to transmitting it to databases 84 and 86 for storage by using a data compression method such as the one disclosed in the, commonly assigned U.S. Pat. No. 6,026,348, filed Oct. 14, 1997, of Hala, entitled "Apparatus and Method for Compressing Measurement Data Correlative to Machine Status," which is hereby incorporated by reference in its entirety. This compression can take place in the data acquisition devices 60, the data acquisition module 20 and/or the database module 80 prior to transmitting data to databases 84 and 86 for storage.

The database 82 is preferably a high performance relational database that includes asset configuration, instrument configuration, compressed data, and non-compressed data. The database 82 is able to store streaming real time data from online data acquisition devices. It also stores periodic data from external data sources and portable data collectors. A key to the design of the system 10 is its ability to normalize these inputs into a predefined standard so it is easy for the database 82 to store data and for the display application to present data in a consistent manner regardless of its source.

The main data source for the database 82 is normalized transducer/sensor data acquired from the data acquisition core 22. The database 82 also outputs data to the data exporter modules 300 for use by external applications including external database 304 and customer applications 306 (please see FIG. 3). The database 82 also outputs preprogrammed events to external applications and to a variety of media. For example, the database can output data to event notification devices 308 such as email, pagers, telephones, cellular phones or other human machine interfaces.

Display Module Architecture and Views

Figure 6:
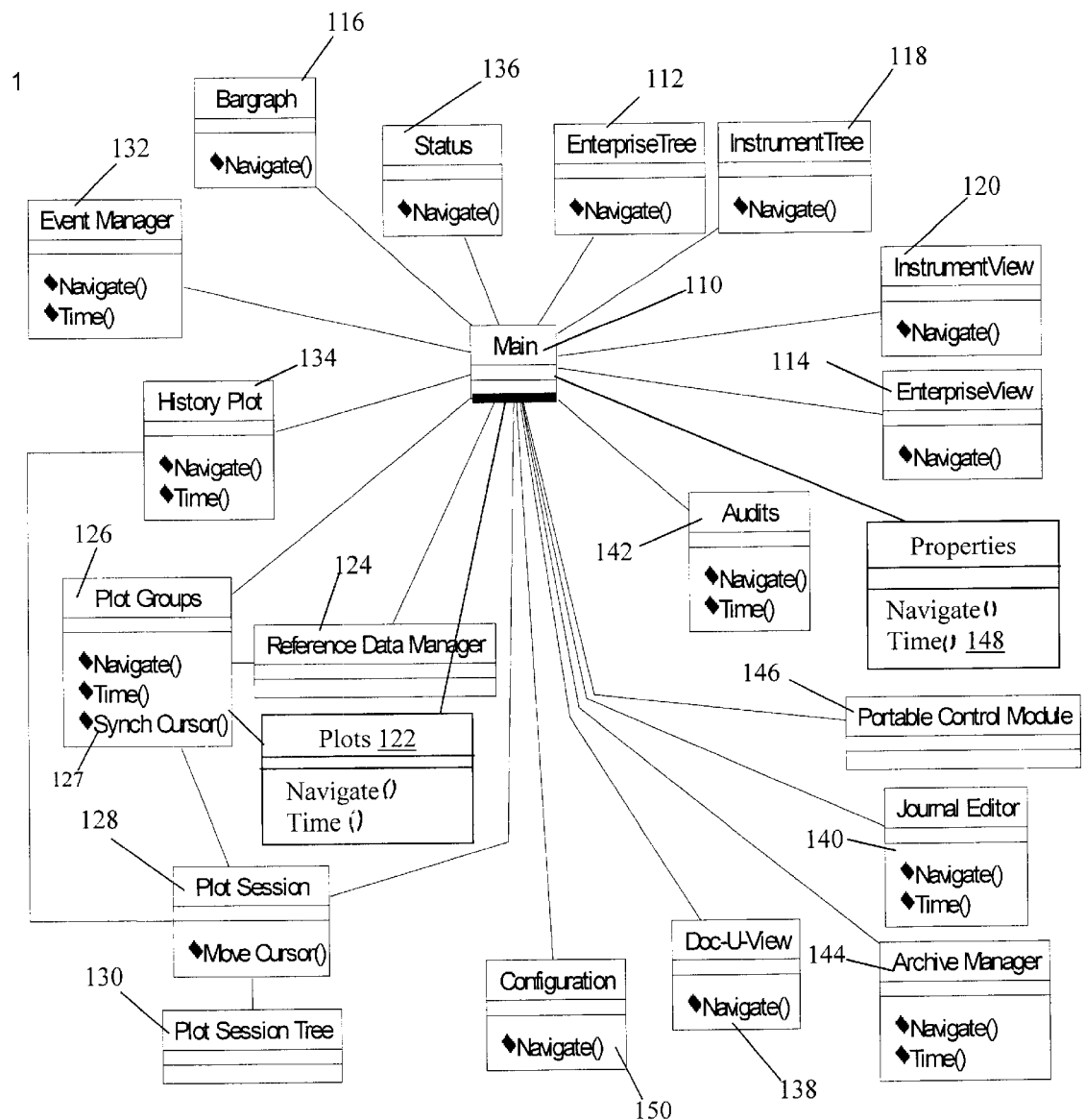
FIG. 6 is a flowchart view of object architecture of the display and configuration modules according to the instant invention.

Referring now to FIG. 6, a schematic depiction is shown of the object architecture of the display module 100 according to the instant invention. The display module 100 uses a connection interface and scripting based logic to link a collection of independent objects and views together into object groups that function together to provide asset management and machinery diagnostic services.

The two main links are navigational and time. Thus, objects are linked through time and/or location. A time link specifies a historical span in time, such as from one particular date to another particular date or as a current or real-time link. Location refers to a location within a plant including object assets (e.g., plant, unit, machines, couplings, bearings, seal, et cetera), instrument assets such as monitoring systems and transducers/sensors, and knowledge assets such as predetermined data presentations useful to view assets. Additionally, location refers to physical or abstract structures.

The object architecture of the display module 100 allows objects to choose to participate in links or act independently. If an object chooses to participate in a link, it can register this request through a main application class 110, and subsequently receives link commands.

Particularly, the main application class 110 functions as both a central manager for broadcasting link commands and as an application manager that acts as a central command center for objects to communicate with each other. Objects can send and receive link (navigation or location) commands through main 110. The main application class 110 manages each view displayed of asset objects or asset representations on the graphical user interface 102 of the system 10, and directs what actions can be performed on various objects. Objects will expose what type of data they contain to main 110, and main 110 will script the actions on components together. The specific object architecture and associated graphical user interface views will now be delineated in detail.

Enterprise Tree Object and Enterprise Tree View

Figure 7:
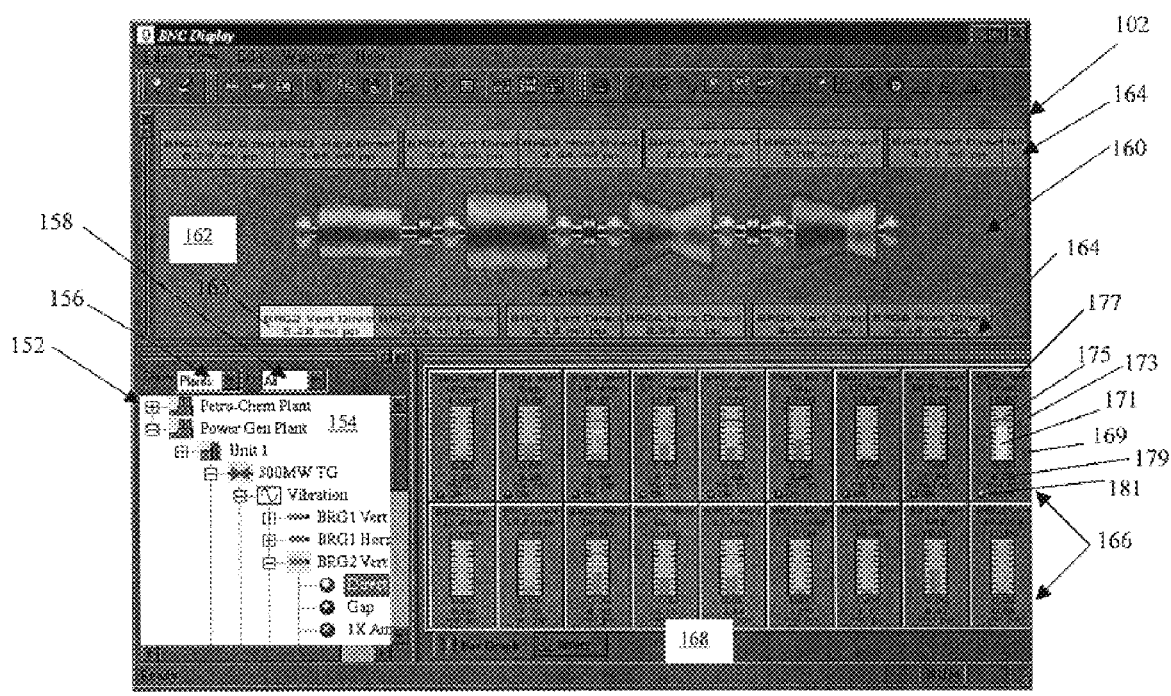
FIG. 7 is a screenshot view illustrating different views of the unified graphical user interface including a hierarchical enterprise explorer view, an enterprise graphical view and a bargraph view according to the instant invention.

Referring to FIGS. 6 and 7, an enterprise tree object 112 presents, via the unified graphical user interface 102, a hierarchical enterprise tree view 152 in a widow 154 of asset objects or asset representations. The enterprise tree object 112 participates in a navigation link as the user navigates through the enterprise tree 152, other objects participating in the navigation link update to the current location in the enterprise.

The hierarchical enterprise tree view 152 behaves similarly to the familiar "Windows® explorer view" showing a hierarchical explorer view 152 of the enterprise. Thus, the hierarchical enterprise tree or enterprise explorer view 152 is analogous to the familiar file and folder view that allows users to navigate in a hierarchical manner. Uniquely, this view allows navigation effortlessly from typical object assets such as plant, unit, machine, bearing, seal, to instrument assets such as monitoring systems, to transducers/sensors, and to knowledge assets such as predetermined data presentations (e.g., plots) useful to view assets. The enterprise tree object 112 clearly represents each asset with a correlative descriptive icon on the unified graphical user interface 102 as exemplified in FIG. 7.

The enterprise tree object 112 can also include filters that allow the user to view only certain asset objects and/or only certain assets and their associated attributes. Placing filter menus on the explorer window 154 can access these filters. For example, the explorer window 154 can include a first filter menu 156 that allows the user to view all plants (e.g. petrochemical plants, power generation plants, et cetera), all groups (e.g. crude unit A, crude unit B, Unit 1, et cetera), all trains (e.g. turbine trains, pump trains, et cetera), or all measurement points on the assets. Additionally, the explorer window 154 can include a second filter menu 158 that allows the user to sort assets based on their attributes such as alarm status. For example, second filter menu 158 can allow the user to view asset with any alarms present, assets with danger alarms present or assets with alert alarms present. The filters 156, 158 can be used in combination to show plants, groups, trains or measurement points with any alarms present, with danger alarms present or with alert alarms present.

The enterprise tree object 112 can also visually show current alarm status on the hierarchical enterprise tree view 152 and propagate those statuses through the hierarchy, providing detailed alarm and summary alarm views simultaneously. For example, and referring to FIG. 7, the enterprise tree view 152 reveals that an alarm is present by displaying the "Power Gen Plant" object in a configurable severity level color highlight as discussed supra. The user can then follow the color highlighting course by clicking on the severity level color highlighted objects which in this example include the "unit 1" object, the "300MW TG" object and the "BRG 2 Vert" object. Clicking on the "BRG 2 Vert" object reveals that the cause of the alarm is a direct reading on the vertical two bearing. Thus, by drilling down the hierarchical enterprise tree of the "Power Gen Plant" by following the course laid out by the severity level color highlighting quickly reveals that the cause of the alarm is the direct reading on the vertical two bearing of the 300MW turbine associated with the "unit 1" machine train of the "Power Gen Plant" enterprise. Thus, the alarming and severity level color highlighting features of the instant invention provide the user with continuous visual feedback that rapidly guides the user to the alarming event by following a severity level color highlighted course or path.

Enterprise View Object and Enterprise View

Referring to FIGS. 6 and 7, an enterprise view object 114 presents a graphical (two and three dimensional objects) enterprise or asset view 160 in an enterprise or diagram window 162, via the unified graphical user interface 102. The enterprise view 160 is configured to model the actual plant layout or the physical appearance of the asset or machine and shows plants, structures, machines, couplings, bearings, measurement locations, transducer orientations et cetera. The enterprise view 160 behaves as a graphical view of the enterprise tree 152 and the user can navigate through locations via the enterprise view 160 by graphically selecting and "drilling" into two and three-dimensional objects. The enterprise view 160 also shows individual measurement location views 164 providing status and current value presentations.

The enterprise view object 118 and thus, the enterprise view 160 participate in the navigation link. Thus, if the user clicks through the enterprise tree 152, the graphical enterprise or asset view 160 follows the navigation although the user is not directly interfacing with the asset view window. These linked views may be driven by the user or by alarms. Because all views are linked exploring root cause of alarm is rapid, one click and the user sees the asset where the alarm is and instrumentation that generated it. For example, and referring to FIG. 7, one click on the "300 MW TG" object in the explorer view 152 results in the user being presented with the asset view 160 shown in window 162 that visually presents a severity level color highlighted measurement location 165 that has the same configurable severity level alert color as that presented in the explorer tree 152. Thus, the instant invention speedily presents the user with visual feedback in both windows 154 and 162 of the cause of the alert and these window views are linked to follow each other's navigation. Additionally, the user can drill down the objects in the graphical enterprise or asset view 160 by subsequently clicking on severity level color highlighted objects for following a severity level color highlighted course or path to an alarming event.

Bargraph Object and Bargraph Views

Referring to FIGS. 6 and 7, a bargraph object 116 presents graphical bargraph views 166 in a bargraph window 168, via the unified graphical user interface 102. Bargraph objects 116 can participate in navigation links and can be customized and configured on a per user basis. In addition, users can create customized bargraphs containing only particular points of interest and these customized bargraphs can be stored as files and shared between users.

The bargraph views 166 graphically show current values via dynamically changing graphical bars 171. The bargraph views 166 can also show one are more alarm level or setpoints. For example the alarm levels 173, 175 show setpoints configured for measurement location 177. Furthermore, the bargraph views 166 can show current values via nomenclature 179 and graphically show current status nomenclature (e.g. ok, not ok, alert, danger, alarm and no data). Additionally, an indicator 181 may be provided which may flash when the asset is in an alert, danger or alarm status. The indicators 181 are preferably highlighted with the same configurable colors for alert, danger and alarm statuses as used for objects that are in these statuses in the explorer and asset views.

As mentioned, bargraph objects can participate in links. Thus, if the user right clicks on any hierarchical level or on a component in the view 162, the user can selectively display the bargraph. Alternatively, when the enterprise tree view 154 revealed that "Power Gen Plant" had an alert and the user drilled down the hierarchical enterprise tree to the vibration transducer, the bargraph view 166 may simultaneously follow thereby allowing the user to have visual feedback in the form of bargraphs including the bargraph 169 of the vertical bearing two showing the graphical bar 171 in the same configurable severity level color highlight as the associated alarming objects are shown in both the tree view 152 and the graphical view 160. In addition, the bargraph 169 shows the graphical bar acceding the setpoint 173 and displays nomenclature 179 that numerically details the bargraph value and shows that this asset is in an "alert" condition. Furthermore, indicator 181 can flash the highlighted alert color.

The above delineation discloses that the bargraph object may or may not automatically participate in links. Generally, all of the objects that support navigation can do so in two forms: a real time form (automatic links like the Explorer Tree and the Graphical View)—or just as a "one time shot"—or BOTH. Take the Bargraph or Event Manger for example,—the user has navigated somewhere in the Enterprise Tree or Graphical View. They then, off the selected item, can bring up a Bargraph, Event Manager (or any other object that support Navigation). These objects bring up their data from the currently navigated location. Now, if the object wants, it can then participate in "Real Time" or automatic navigation—where it then automatically navigates with the user as they navigate through the system.

However, the key here is that an object may or may not wish to participate in "automatic" links. This can be an option for components, such as the Bargraph, or Event Manager—wherein the user will be able to configure components to participate in automatic links or not.

So, if we look again at the Bargraph example—the Bargraph can be spawned from the currently navigated asset—but does not automatically update as the user navigates through the system. But, in the alternative, an option can be provided to "participate this bargraph in navigation."

Figure 8:
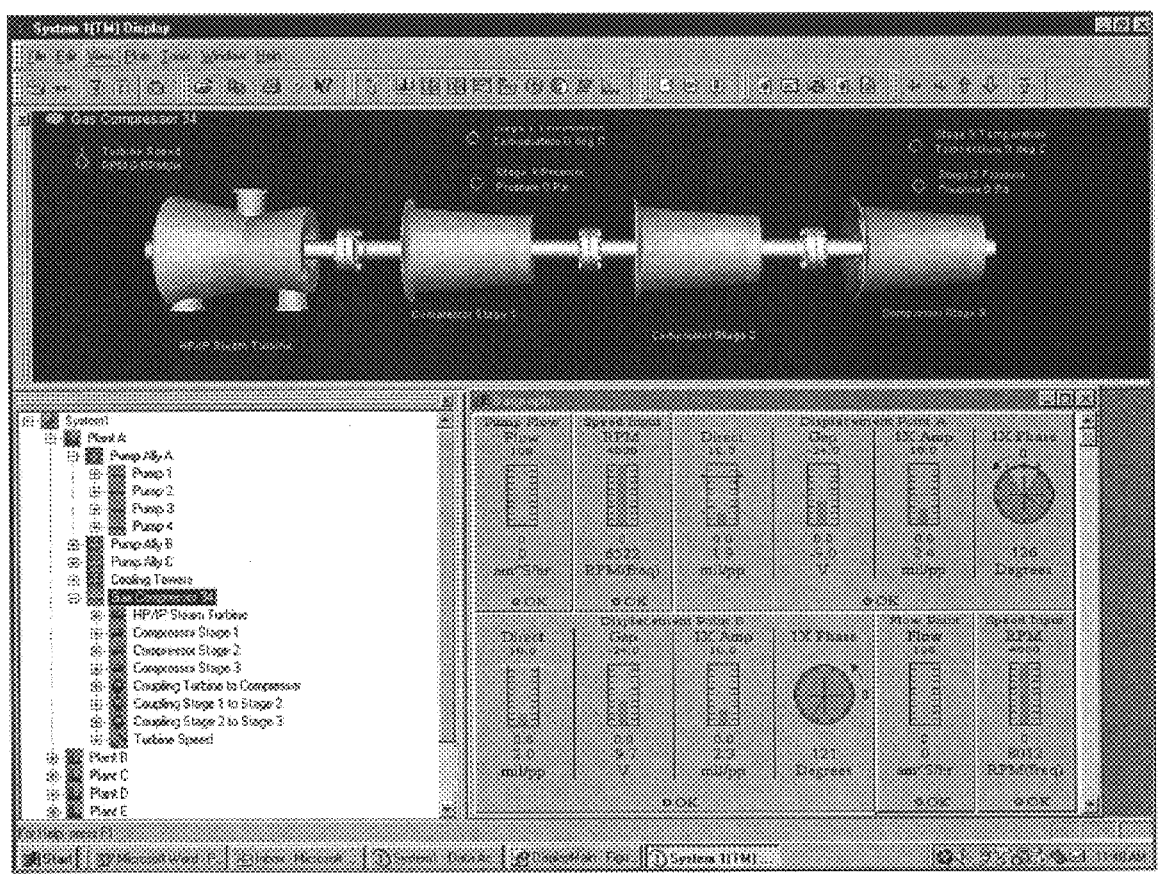
FIG. 8 is a screenshot view further illustrating the bargraph view according to the instant invention.

FIG. 8 exemplifies further graphical bargraphs that can be displayed in the bargraph window 168 via the bargraph object 116. In particular, FIG. 8 shows, a 1×amplitude bargraph and a corresponding 1×phase bargraph thereby defining a vector value. Amplitude and a phase bargraphs can also display regions for defining an acceptance region such that an alarm event will occur if the associated vector value falls outside of the defined acceptance region.

Instrument tree Object and Instrument Tree View

Figure 9:
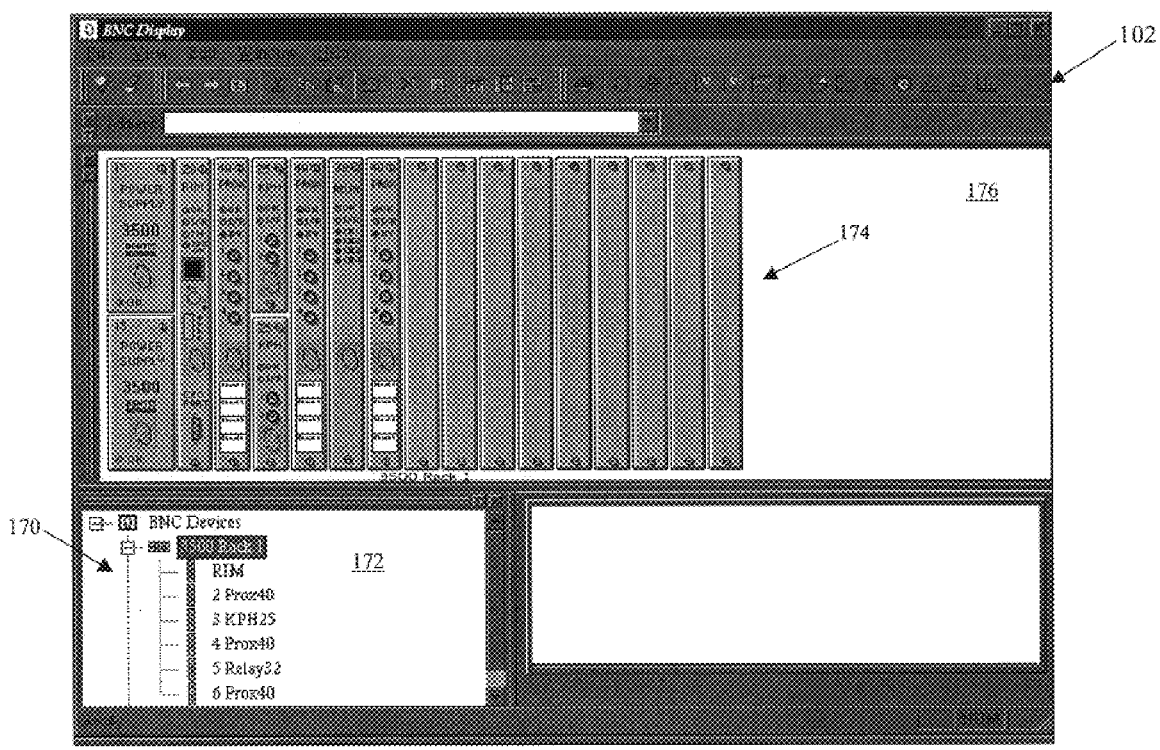
FIG. 9 is a screenshot view illustrating views of the unified graphical user interface including a hierarchical instrument explorer view and an instrument graphical view according to the instant invention.

Referring to FIGS. 6 and 9, an instrument tree object 118 presents, via the unified graphical user interface 102, a hierarchical instrument tree view 170 in an instrument tree view window 172. The hierarchical instrument tree view 170 behaves similar to the hierarchical enterprise tree view 152 and thus, it behaves similar to the familiar "Windows® explorer view" for showing enterprise installed instrumentation including data acquisition devices 60. The unified graphical user interface 102 preferably represents each instrument object with a correlative descriptive icon.

The instrument tree 118 participates in the navigational link. Thus, as the user selects instruments in the instrument tree, other objects participating in the navigation link will show what data that instrument collects.

Instrument View Object and Instrument View

The display module 100 also includes an instrument view object 120, which presents a graphical (two and three dimensional objects) instrument view 174 in an instrument window 176 via the unified graphical user interface 102. The instrument view 174 is analogous to the enterprise view 160, but is configured to model the actual instruments installed in an enterprise and behaves as a graphical view of the instrument tree view 170. Thus, the user can navigate through the system through the instrument view 174 by graphically selecting and "drilling" into two and three-dimensional objects. In addition, the instrument view 174 shows individual measurement locations providing status and current value presentations. Furthermore, the objects in the instrument view 174 are preferably capable of being rotated such that, for example, the back of an instrument including its associated wiring may be viewed by the user thereby providing value to the user view the actual wiring of that instrument for setup and diagnostic purposes.

The Instrument view 174 allows the user to see status, alarms, and configuration referenced from the instrumentation system including data acquisition devices 60. Instrument assets may be controlled (for instance resetting machine protection alarms) and configurations may be changed in this view. The instrument view 174 can participate in links and is always synchronized with the other views of the system 10.

Plots Object and Views

Figure 10:
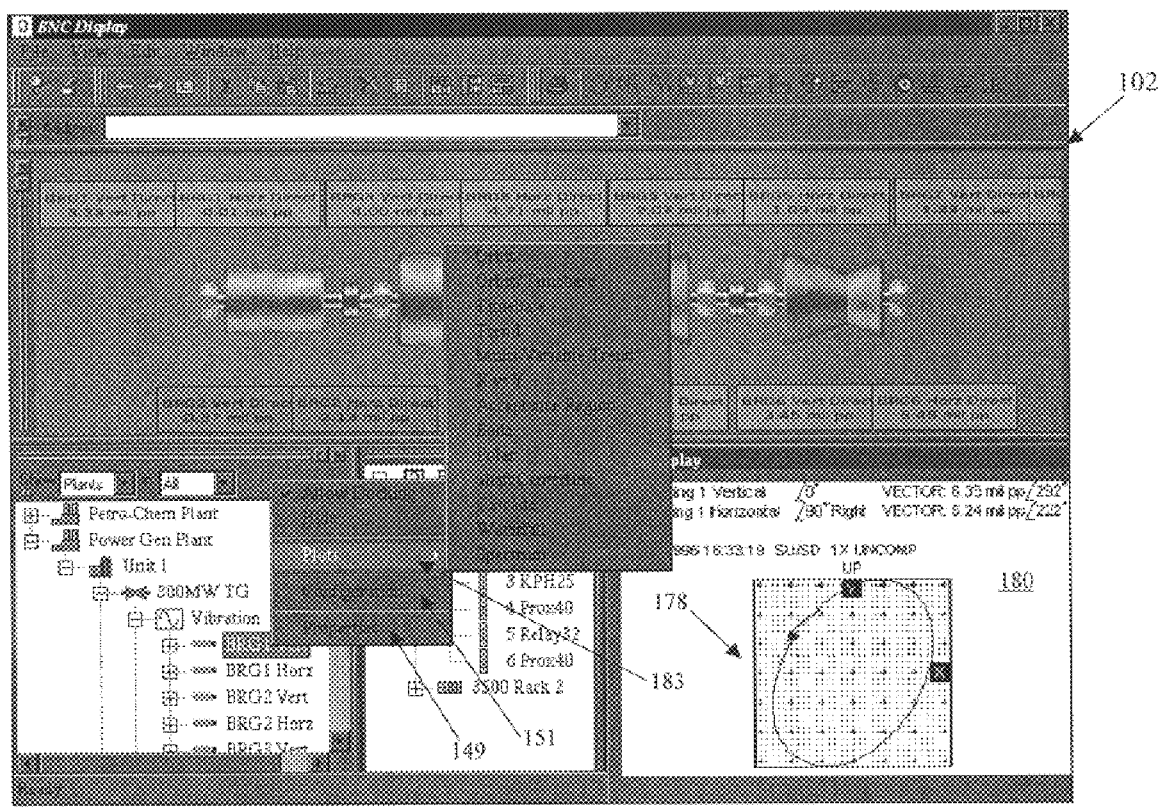
FIG. 10 is a screenshot view illustrating views of the unified graphical user interface including a plot view and a plot selection menu according to the instant invention.
Figure 20:
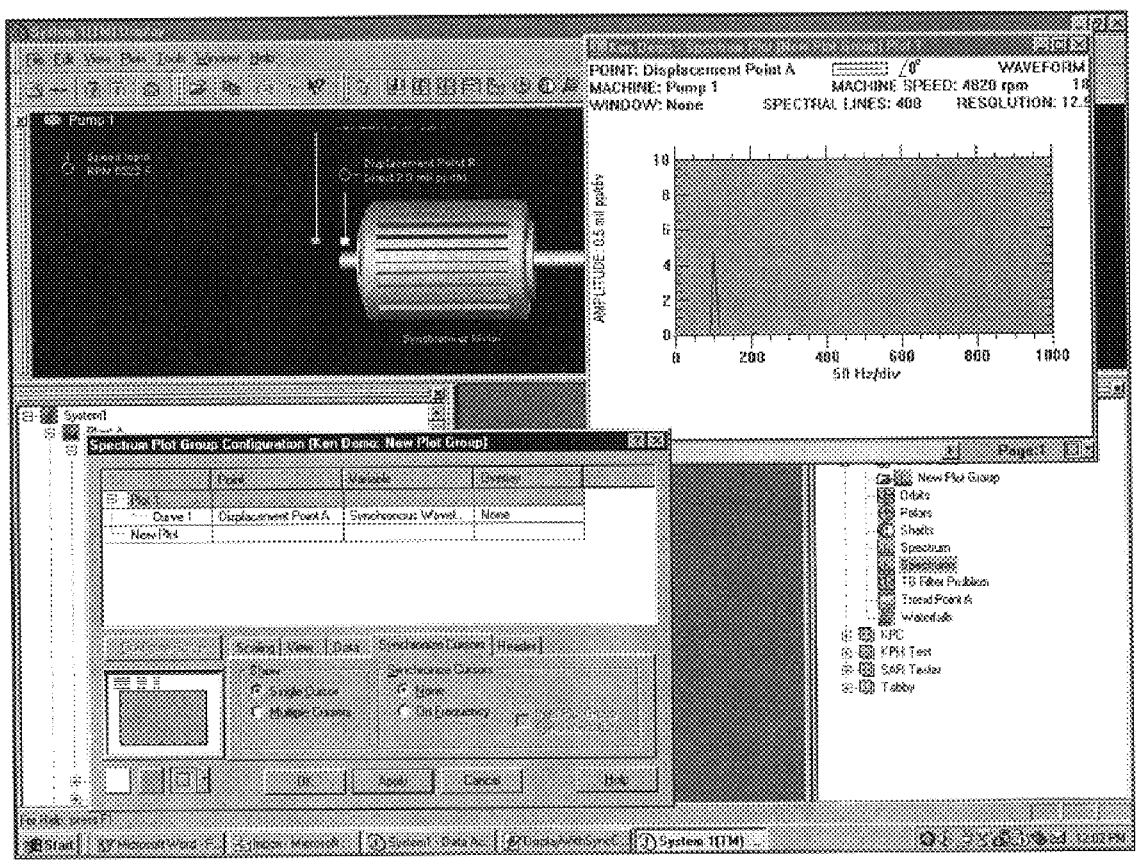
FIG. 20 is a screenshot view illustrating views of the unified graphical user interface including a real time plot view, a real time plot configuration view and a plot session hierarchical view according to the instant invention.

Referring to FIGS. 6 and 10, a plot object 122 presents, via the graphical user interface 102, formatted data presentation plot views 178 in a plot view window 180. Plots can be graphical or textual. A plot is an object that provides a single, concise view of data acquired through the relational database module 82 (including the historical/machine database 84 and the configuration database 86), the data acquisition module 20 (including real-time data), external database 210 including third party databases and data servers. Thus, plots can be both static presentation of data, or "active" presentations of real-time data (Please see FIGS. 11 and 20, respectively). The display module 100 also employs the plot object to display both static and real time data on the same plot providing a unique comparison of real time vs. historical data. Additionally, the display module 100 can show plots with overlaid data, such as event markers, that indicate when a particular alarm or system event occurs in time. Plots can participate in links.

Additionally, the plot object can present, via the graphical user interface 102, asset data plots on multiple points simultaneously. It is unique in its ability to present real time data and historical data simultaneously. Real time data comes directly from transducers/sensors 70 via the data acquisition core 22 and provides results similar to connecting an oscilloscope, chart recorder, meter or spectrum analyzer directly to a measurement point. Historical data is retrieved directly from the relational database 82 and might be from non-real time devices such as a portable data collector or it might be stored real time data. The system has a wide variety of plot choices which include, but are not limited to, orbit (x vs. y, no time sweep oscilloscope view), orbit/timebase, timebase (similar to oscilloscope), high resolution trending, multi-variable trend, X vs. Y, acceptance region, bode, polar, shaft centerline, cascade, waterfall, full and half spectrum vs. time, and full and half spectrum vs. speed. The plot choices can be accessed via a plot menu 183.

Reference Data Manager and View

Referring again to FIG. 6, a reference data manager object 124 stores a collection of baseline and slow roll compensation samples for measurement locations defined in the system 10. The reference data manager allows the user to create, delete and edit reference data that can be applied to historical or real time data plots. Reference Data Manager 124 can participate in links.

Plot Groups Object and View

A plot groups object 126, provides a collection of similar plots (such as Orbit or Trend plots). Plot groups allow the user to page through large sets of plots included in the system 10 and view these sets in the plot view window 180 via the unified graphical user interface 102.

Plot Session Object and View

A plot session object 128 provides plot sessions comprised of a collection of logically related plot group objects. Hence, plot sessions are comprised of one or more plot groups, plot groups are comprised of one or more plots, and plots are comprised of one or more data sets.

Plot sessions can participate in links. Sessions can be saved, and retrieved. Plot Sessions can be saved locally (on the display client) for private viewing, or shared in the database 82, for example the configuration database 86, for multiple users viewing and editing.

Plots sessions contain a single configuration that can be applied to all plots in the session (such as time range). Plots in the session can operate independently, or use the single session configuration.

Figure 11:
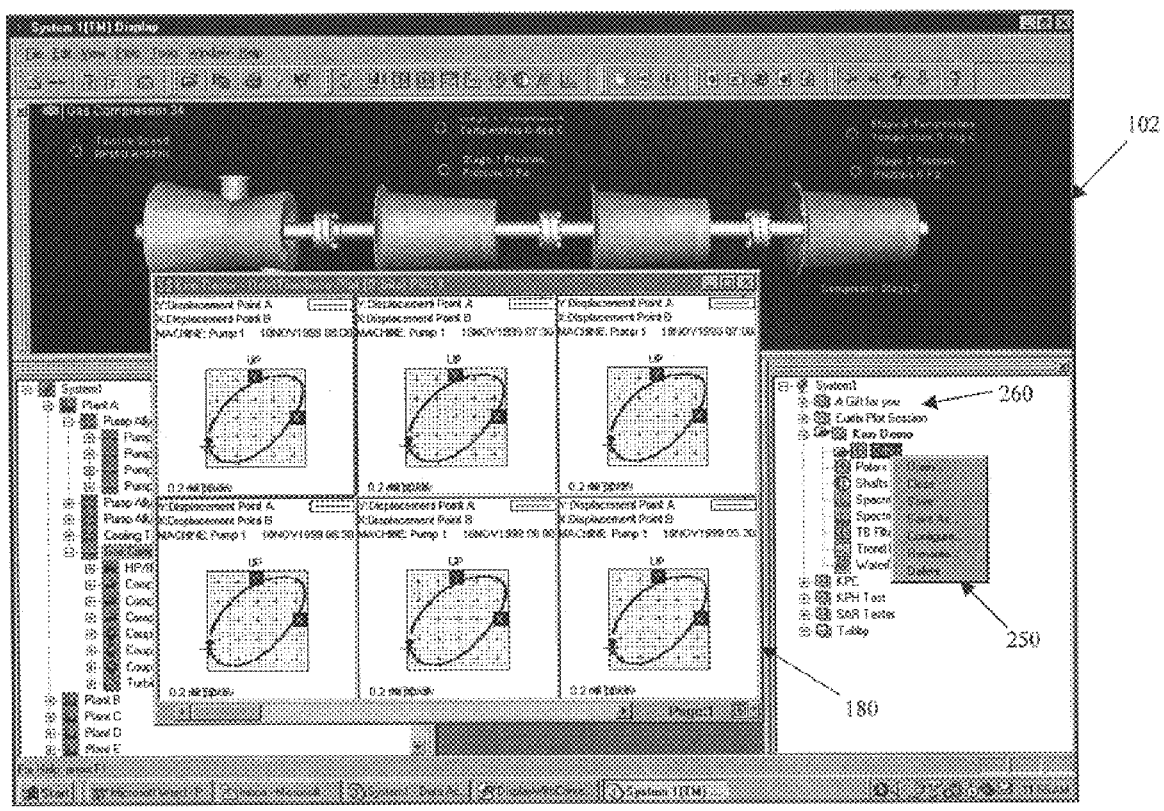
FIG. 11 is a screenshot view illustrating views of the unified graphical user interface including a plot session graphical view and a plot session hierarchical view according to the instant invention.

Referring to FIGS. 6 and 11, a plot session has the interface in the plot session tree 260—the top-level folders that the user can expand to view the plot groups in a given session. The user can page through plots in a plot group. Plot groups show multiple plots, and the user can "page" through these plots with the horizontal scrollbar at the bottom of the plot group window 180.

A plot session can be configured to show orbit plots in the plot view window of data collected from a pair of displacement points (displacement point A and displacement point B) at defined time intervals (5:30, 6:00, 6:30, 7:00, 7:30 and 8:00). Furthermore, the plot session object 128 allows the user to page through large sets of plot groups included in the system 10 and view these groups in the plot view window 180 via the unified graphical user interface 102.

Figure 12:
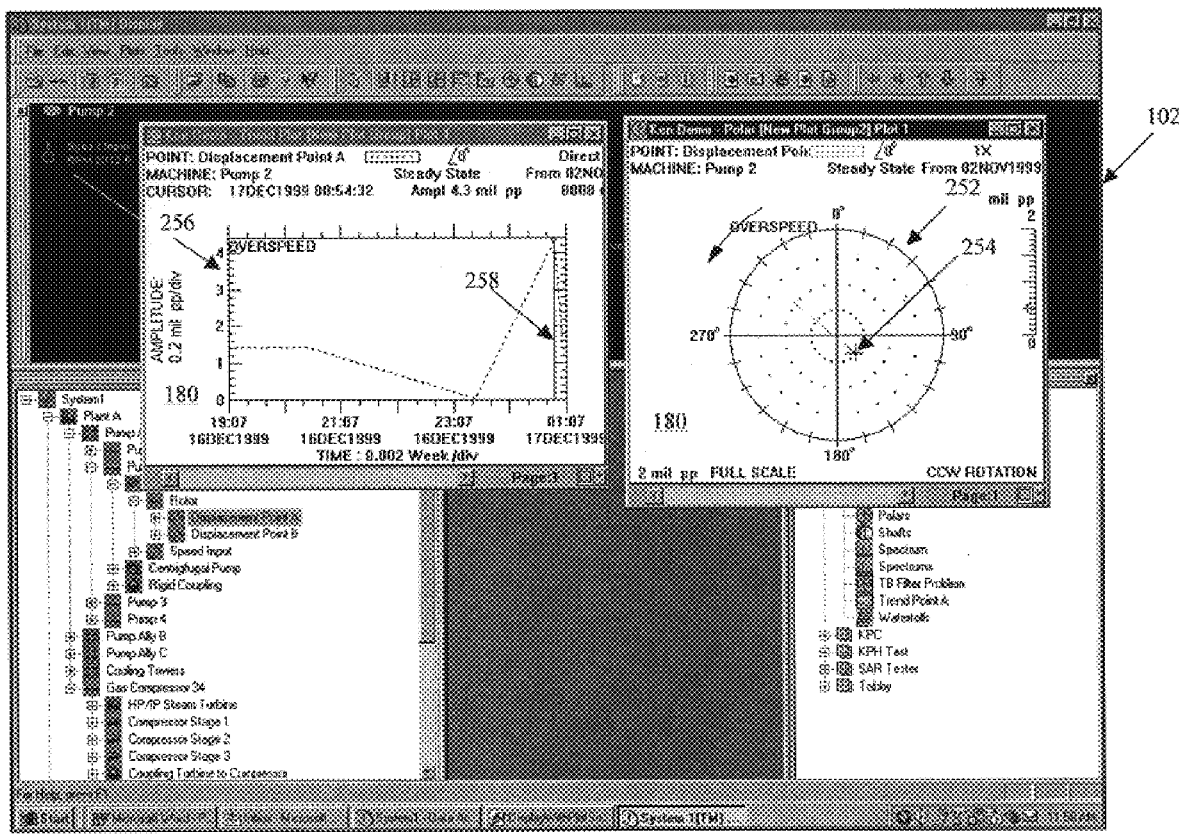
FIG. 12 is a screenshot view illustrating views of the unified graphical user interface including trend and polar plot views having synchronized cursors.

Furthermore, and referring to FIGS. 6 and 12, the plot session object 128 uniquely provides a synchronized cursor link through plot groups object of multiple plot windows brought up or opened simultaneously via a menu 250. For example, and referring to FIG. 12, a polar plot 252 having a first cursor 254 and a trend plot 256 having a second cursor 258 are shown in plot windows 180. The plot groups object links these two cursors together via the synchronized cursor link 127. Thus, as the user "scrolls" through data in the polar plot 252 with the first cursor 254, the second cursor 258 in the trend plot 256 automatically "scrolls" to the same sample as the driving plot or as scrolled to with the first cursor. Conversely, as the user "scrolls" through data in the trend plot 256 with the second cursor 258, the first cursor 254 in the polar plot 252 automatically "scrolls" to the same sample as the driving plot or as scrolled to with the second cursor 258. This allows the user to quickly and simply compare and correlate data from different and same plots.

Thus, in general, as the user "scrolls" through data in a given plot, all other plots participating in the synchronized cursor link are automatically scrolled to the same parameter such as a sample parameter, time parameter, RPM parameter, et cetera as in the driving plot by receiving the value of the parameter scrolled to in the driving plot and scrolling the cursor to a matching parameter in the driven plot. Again, this allows the user to quickly and simply compare and correlate data from different and same plots. Furthermore, the synchronized cursor link allows view a plurality of plots at the same point without scaling efforts.

Plot Session Tree Object and View

Referring to FIGS. 6 and 11, a plot session tree object 130 (similar to the enterprise and instrument tree objects) shows a graphical plot session tree view 260, via the graphical user interface 102, of all available plot sessions. The plot session tree 260 is unique in its ability to show all configured plot groups as the plot session is being constructed. The user can then quickly see what plots have been added to the plot sessions and choose to open, close and edit individual plot groups, and entire sessions from the plot session tree view 260.

Plot Objects and Views In Use and Operation

Referring again to FIGS. 6, 8 and 11, the instant invention includes a variety of plot objects and views that will now be further explored from a user standpoint. The user can simply select a point or variable, and choose the plot of interest, and a default plot will be presented. On the other end of the spectrum, the system 10 allows plotting for the high-end diagnostics engineer who demands maximum flexibility and customization.

Simple Plotting is where a user selects a point or variable anywhere in the system and chooses a plot. Most commonly, the user will select a point or variable in the enterprise tree and choose a plot. If the user chooses a point then a default set of variables will be used to produce a plot, and if the user chooses a variable, the user can be specific about exactly what variable the user would like to see. For example, if the user selects a point on the tree, and chooses the trend plot—the user will be presented with a single trend plot showing the 1x and direct variables. On the other hand, if the user wants to see a trend plot for just, say, GAP, then the user can select the GAP variable, and then select a trend plot.

There are two main ways to select what point or variable the user wishes to plot. The first way is by using the plot toolbar that can be located right under the main menu. The plot toolbar always operates on the current navigated location. If the user is currently navigated on a point, then the plot toolbar operates on that point. If the user is currently navigated on a variable, then the plot toolbar operates on that variable. If the user is currently navigated on something other than a point or variable, then the user will be presented with the plot configuration screens, as the system 10 does not know what point or variable the user wants to view. The second way to bring up a plot is to select any point or variable the user can see in the system by, for example, right clicking that point or variable, and choosing a plot. For example, to bring up a bargraph, right click on any variable, and choose a plot from that variable. Or, right click on a variable and the machine train, and choose a plot.

The basic model of plotting is as follows. The main unit of plotting is what is referred to as the plot group. The plot group includes of one or more plots. Each plot, in turn, is composed of one or more variables. At the top of the model, is something like the plot session, which is composed of plot groups. Thus, a simple illustrative hierarchy is as follows: plot sessions contain plot groups, plot groups contain plots, and plots contain curves.

Starting at the bottom and going up, a single plot can show one or more variables. For example, in a trend plot, the user can view a plurality of variables at the same time for performance comparative analysis across multiple variables on a single plot. Preferable, all plots in the system 10 plot multiple variables on a single plot. In fact, the system 10 can overlay either different variables, or the same variable, but at different times in the same plot. For example, the user could create a polar plot and show the 1x and 2xvariables in the same plot or, the user could produce a polar plot that shows two sets of 1xdata, one set being from, say, last month, and the other set being from last year.

A plot group is just a collection of plots that appear in the same window. For example, the user can create a plot group that consists of ten trend plots. Each of those trend plots can contain ten variables. If the user chooses to show two plots per page, then the user would have a total of five pages of trend plots to flip or page through. In each plot group, the user can create an arbitrary large number of plots, and choose how many plots per page the user wishes to view.

A plot session is a structure that contains and stores an arbitrary number of plot groups that can share a common date range for plotting. For example, the user can create a plot session for the month of March. In that plot session, the user can store five trend plot groups, three spectrum groups, and one XY plot group if the user chooses. In fact, the user can store any number of arbitrary plot groups in a single plot session. A plot group allows the user to create an arbitrary number of plots.

Plot configurations of the system 10 include a number of choices and options. It is not necessary that the user knows or configures each of these options. Each time the user brings up a plot configuration screen, non-configured options are preferably filled in with simple defaults the user can either override or leave alone. The system 10 saves the plot group's configuration including the configuration for everything in a plot group (plots, data sets in plots) for later viewing. The system 10 also allows the user to save multiple plotting configurations into a single plot session for later viewing.

Event Manager object and View

Figure 13:
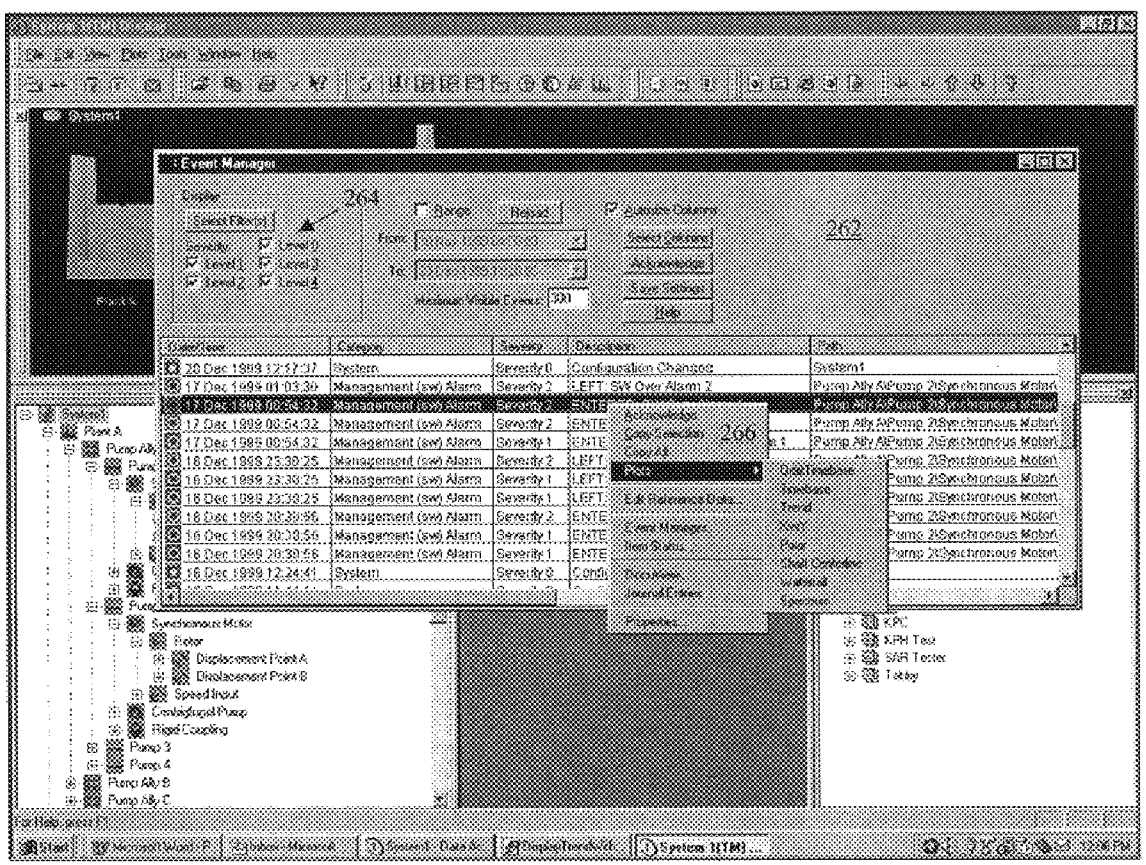
FIG. 13 a screenshot view illustrating views of the unified graphical user interface including an event manager view according to the instant invention.

Referring to FIGS. 6 and 13, an event manager object 132 is a special plot presentation that displays an event manager view 262 of both system and alarm events. System events are specific events in time that refer to the health and operation of the system 10. Alarm events are exception conditions that occurred on assets coupled to the system 10. The event manager object 132 supports both navigational and time links. Additionally, the event manager object allows the user to filter alarms via a filtered selection display 264 thereby allowing the system 10 to provide filtered status on any location in the Enterprise as the user navigates through the system 10. The Event Manager 132 further allows the user to launch plots via menu 266 from the event manager view 262 to present supporting evidence for any given event.

History Plot Object and History Plot View

Figure 14:
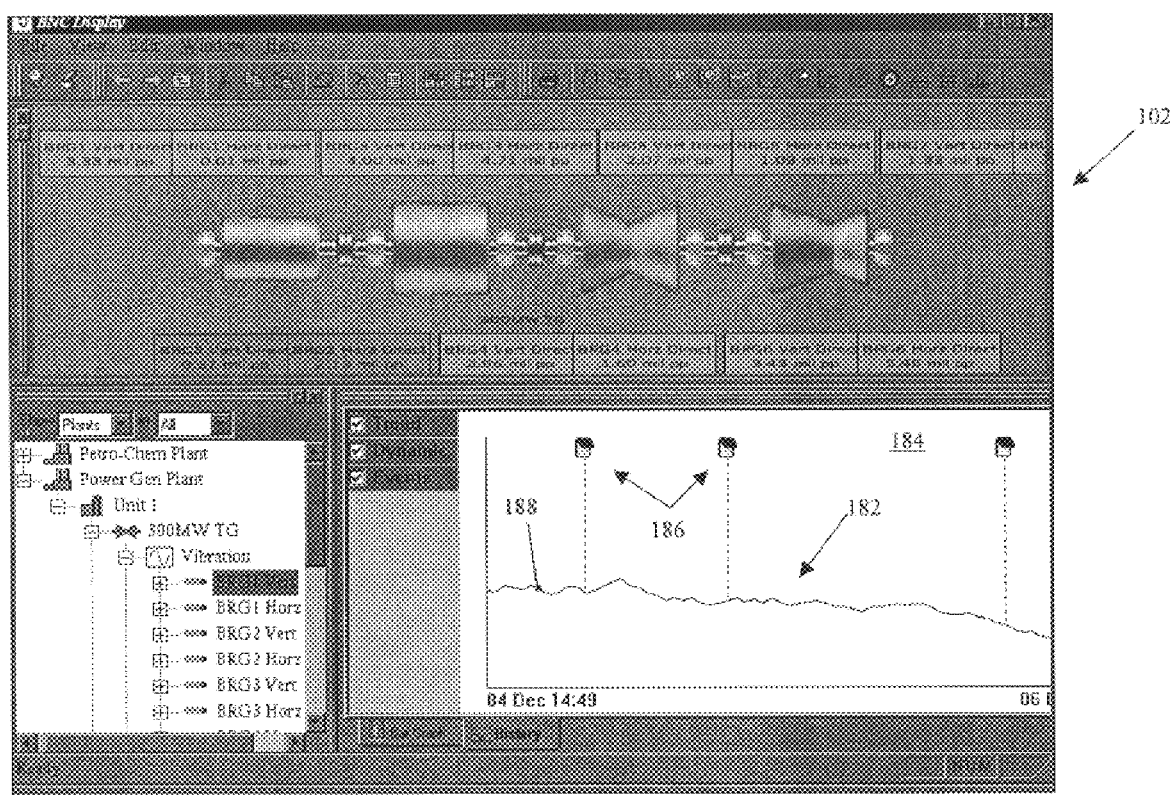
FIG. 14 is a screenshot view illustrating different views of the unified graphical user interface including a hierarchical enterprise explorer view, an enterprise graphical view and a history plot view according to the instant invention.
Figure 15:
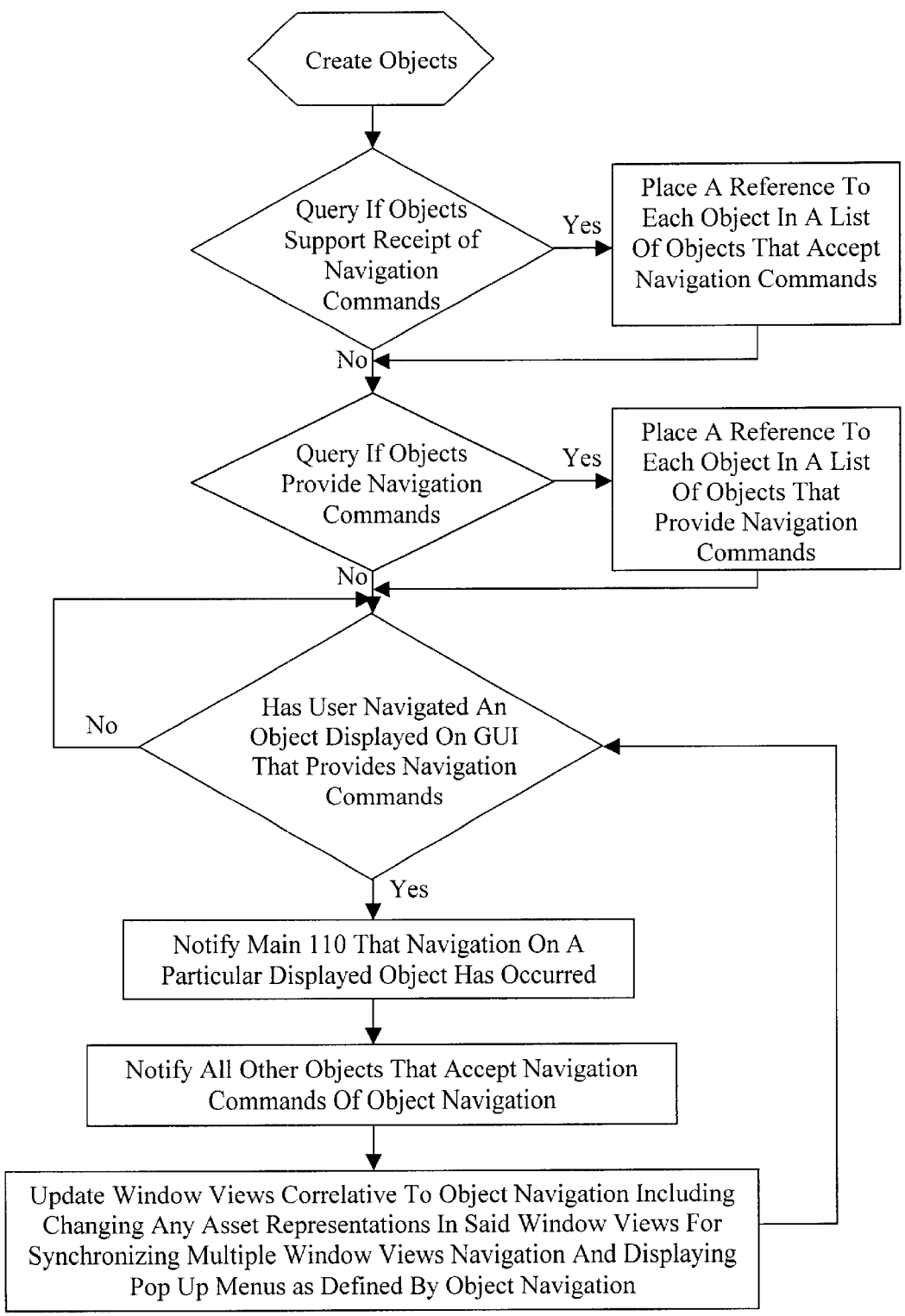
FIG. 15 a flowchart view of the object navigation process according to the instant invention.

Referring to FIGS. 6 and 14, a history plot object 134 presents, via the graphical user interface 102, a history or trend plot view 182 in a history plot view window 184. The history plot view 182 is a special time based plot that shows trended information for one or more measurement locations. The history plot participates in time links and is used to configure time or run definition spans. The history plot also participates in navigational links and shows recent historical trend data for measurement locations in the system 10 as the user navigates through instrument or enterprise tree hierarchies and graphical views.

Thus, if a hierarchical icon or a graphical object is selected a time-based plot will display a plot showing instrument point vs. time in the history plot window 184. This is the typical trend plot. The trend plot is unique in that it allows navigation from the trend plot to different points in time to explore the history of the asset. This history could include at least configuration changes, status changes, and availability of detailed data sets or user notes.

Additionally, the history plot object can include event markings 186. The event markings 186 can be used to link to the event manager 132 and thus the event manager view 262 (FIG. 13) such that a listing of all events associated with the system 10 for the specified time frame can be quickly accessed. Events include alarms, diagnostic statuses, asset events (such as start up shutdown), and configuration events. As with all other system 10 displays, the views are linked. Clicking on an event associated with an asset will cause other active displays to display information associated with the event. This information might be the trend plot for the variable that caused the event (time view), the physical location of the asset (enterprise view), all associated plots and hierarchical navigation options (explorer view), and a time base plot of the variable (plot view). Furthermore, the history plot object can include one or more journal markings 188 that provide a link that to a journal editor object 140 such that a listing of journal entries can be viewed and edited for any enterprise or instrument location.

Status Manager Object and View

Similar to the event manager object 132 and event manager view 262, a status manager object 136 presents, via the graphical user interface 102, all current status information for any location in the enterprise via a status manager view in a status view window. The status manager object displays all current status information for any location in the enterprise. The status manager view is navigable, as the user moves through the enterprise; the status manager will link to the current enterprise location and provide real time statuses.

Document Object and View

Also similar to the event manager object 132 and event manager view 262, is a document object 138 that presents, via the graphical user interface 102, a document view (Doc-U-View) in a document view window. The document view is a document management tool that links together all possible file types to enterprise or instrument locations in the system 10. The document object links together and presents documents (or any file types, graphical, executables, et cetera) for a given location (and all subordinate locations). The document object 138 can participate in links.

Journal Editor Object and View

As mentioned, the journal editor object 140 allows the user to edit journal entries for any enterprise or instrument location. The journal editor object can be configured to show journal entries, via the graphical user interface 102, for a particular location and all subordinate locations. The journal editor object 140 can participate in links.

Audits Object and View

Audits object 142 provides user presentation views, via the graphical user interface 102, of decision support audits run against enterprise or instrumentation objects. Audits object can participate in links.

Archive Manager/Database Utilities Objects

An archive manager/database utilities object 144 provides an archive manager that allows the user to back up or archive their database. The archive manager can archive the entire enterprise data, or a portion of the enterprise, all the data, or a piece of the database 82 in time. Archived data can be stored on any media, fixed or removable. Archives can be viewed while the system is off line and can be shared with other system 10 users. The archive manager can participate in links.

Portable Control Module

A portable control module 146 controls uploads and downloads of routes to and from a portable data collector. The user can configure and manage the portable data collector through the portable control module 146.

Asset Management or Properties Object and View

An asset management or properties object 148 provides, via the graphical user interface 102, an asset management or properties view of each asset. This allows users to view asset information and such as: serial numbers, installation dates, manufacturer and model number, machine specifications, process information, linking to manuals and engineering drawings, maintenance history and photographs. These views preferably appear as dialogue boxes that can be accessed by selecting properties 149 on the menu shown in FIG. 10.

Configuration Object and View

A configuration object 150 presents, via the graphical user interface 102, screens that show and allow the user to edit the configuration properties of any enterprise or instrument object. This view is linked to the instrument, enterprise and explorer views. Thus, from any object in the enterprise or instrument hierarchies or other view in the system 10, the user can view and edit the configuration properties for that location or instrument without leaving the currently selected navigated location (the point being worked on). These views preferably appear as dialogue boxes that can be accessed by selecting configuration 151 on the menu as shown in, for example, FIG. 10.

Conceptual and Technical Conclusion of Object Architecture

Conceptually, any object can either accept navigation commands or give navigation commands. For example, the enterprise tree object 112 and the enterprise view object 114, both accept and give navigation commands. Thus, when the user navigates on the enterprise tree view 152 of the GUI 102, that is, points to an object and selects or expands that object, the view object 114 wants to be notified, and when the user navigates in the enterprise graphical view 160, the tree object 112 wants to know. So, in this example, both the enterprise tree object 112 and enterprise view object 114 accept and give navigation commands and may or may not be directly linked.

For example, if objects are directly linked they accept and give navigation commands. Generally, objects can be linked directly to one another for efficiency, but mostly do not. If objects do not link directly to each other, they link through main 110. For example, when the enterprise tree view 152 enterprise view object 114 are not directly linked, the navigation by the user in the enterprise tree view 152 results in main 110 receiving the navigation command and then forwarding it to the enterprise view object 114. Similarly, when the user navigates in the enterprise graphical view 160, main 110 gets the command and forwards it to the enterprise tree object 112. So, in summary, main 110 is the "command" central where all links are routed through. It should be noted that this design does not preclude objects from establishing direct links to each other, but the command center (main 110) does provide benefits that will be explored in further detail infra.

This concept can be expanded to encompass a multiplicity of objects. For example, if a third object wanted to participate in the navigation link, for example, a plot such as that defined by the history plot object 134, it would register itself with main 110 as accepting and providing navigation commands. Now, main 110 is comprised of a list of three objects that are registered as navigation sources and receivers. When the user navigates in the enterprise tree view 152, main 110 traverses the list of objects registered to receive navigation commands and forwards the navigation command to the enterprise view object 114, then to the history plot object 134. If the user navigates in the plot presented by the history plot object 134, the enterprise view object 114 and enterprise tree object 112 are notified. In this case, main 110 receives the navigate command, then forwards it to all other objects that are registered to accept navigation commands.

Thus, the benefit of routing all commands through main 110 is a substantial decrease in the number of required links. Specifically, if objects were directly linked there would be a resultant of N*N links whereas by employing the central command object main 110 according to the instant invention there is a resultant of only N links. Thus, the direct linking method would require four hundred links for twenty objects while employing main 110 according to the instant invention requires only twenty links.

Technically, and according to one preferred form of the instant invention, there are two COM interfaces created which can be defined as INavigate and INavigateSource. Thus, if an object wants to receive navigation commands the INavigate interface would be implemented. If an object wants to provide navigation commands the INavigateSource interface would be implemented.

Specifically, when main 110 creates an object, it asks that object if it supports the INavigate interface. If the object does, then main 110 puts a reference to that object in a list of objects that accept navigation commands. Likewise, main 110 also asks the created object if it supports the INavigate-Source interface. It that object provides navigation commands by supporting the INavigateSource interface, then main 110 gives that object a reference to itself (main). Now, when the user navigates on that object, it will send a message to the reference (i.e., main 110).

Main 110 can register itself with all objects that support INavigateSource as the "sink" or receiver of navigation commands. Objects wishing to receive navigation commands, register themselves with main 110 as "sinks" or receivers of navigation commands. Any single object can do both, receive and accept navigation commands.

To take this yet another step, each object that implements INavigateSource can take "multiple" references to objects that it will send navigation commands to. For example, the enterprise view object 114 can accept references to multiple objects wanting to accept navigation commands from the view object 114.

One specific illustrative example of how this whole process is done is as follows. The enterprise view object 114 supports both the INavigate and INavigateSource interfaces. When main 110 creates the view object 114, it queries first for the INavigate interface, and puts this interface into its map of navigating objects. Main 110 then queries for the INavigateSource interface and then gives the enterprise view object 114 a reference to its own INavigate Interface. Now, the enterprise view object 114 has a reference to mains 110 INavigate interface. When the user navigates on the enterprise graphical view 160, the view object 114 calls back on mains' INavigate interface to notify main 110 that the user has navigated.

The same model used above for navigational links can also be used for time links and synch cursor links. Thus, if an object chooses to participate in a time link or a synch cursor link, it registers this request through main 110, and subsequently receives time link or cursor link commands.

Furthermore, the same navigational model used above is also used for scripting all other commands together. For example, when a user right clicks on the event manager object 132, the user sees a rich list of commands that come from main 110. When a user right clicks on an object, they first put their own specific commands in the menu, then ask main 110 to fill up the rest for them.

All objects wishing to participate in "links" require only a segment identifier (ID). This is a central component to the system 10 and is the identifier for any object in the system. For example, segment identifiers identify all Enterprises, Plants, Machine Trains, Machines, Point and Variables. The segment identifiers dictate the commands or actions a user can perform on an object.

Thus, according to one form of the instant invention, the same model delineated hereinabove for navigating is also employed for general links (or commands).

Technically, and according to one preferred form of the instant invention, there are two interfaces created which can be defined as IPopUpMenu and IPopUpMenuSource. Take the bargraph object as an example. The bargraph wishes to participate in command links—so it implements the IPopUpMenuSource interface. When main 110 creates the bargraph (or any object) it asks the bargraph if it supports the IPopUpMenuSource interface. It is does, main 110 gives the bargraph a reference to its (main 110) IPopUpMenu interface.

When the bargraph is right-clicked—it asks the IPopUpMenu interface (the one it got from main 110) for a list of commands for a given segment ID. Main 110 returns a list of commands that can be supported for the segment ID currently selected. Bargraph then displays that list of commands to the user.

When the user selects one of those commands, the bargraph simply forwards that command to main 110 through the IPopUpMenu interface it has for main 110. Main 110 will then carry out the command.

For another specific example, when the user right-clicks on the enterprise graphical view 160 to bring up Properties or configuration screens for the currently selected item in the enterprise graphical view 160 it is being done through the IPopUpMenuSource interface. The enterprise view object 114 has no knowledge that the user is bringing up configuration screens. It simply got a list of commands or actions that can be performed on that segment ID. If the user chooses one of those commands, it forwards that request to main 110.

The "beauty" of this system is that objects can "link" together either through Navigation, or Commands, or Both—without requiring any specific knowledge other than a segment ID. An object simply supports any or all of the above four interfaces and the interaction between objects is automated through main 110. This allows all objects to appear linked together—although none of the objects have any specific knowledge of one another.

Synchronized Cursor Architecture Detail

As noted hereinabove, and with reference to FIGS. 6 and 12, the plot session object 128 uniquely provides the synchronized cursor link through plot groups object of multiple plot windows brought up or opened simultaneously via menu 250. This concept will now be further explored now that navigational links have been delineated in detail.

More specifically, and referring to 18, the system 10 includes the plot session tree 130, a plot session manager 131 that includes plot sessions 128, plot sessions 128 that include plot groups 126, plot groups that include plots 122 and plots that include data sets 121. The user may choose to synchronize cursors just within a single plot group—or between selected plot groups contained in a plot session.

The user can choose what method of synchronization—synchronize on sample Number, synchronize on speed, synchronize on time, or synchronize on frequency. The architecture is designed such that plot groups can "elect" or volunteer to participate in the synchronization of cursors in a given plot session analogous to the above navigational link discussion.

At the heart of the design is the plot group 126. The plot group is the separate window that houses or contains plots. The plot group is the main "visible" component that the user interacts with. The user can manipulate the plot group to preferable show 1 plot per page, or 2 or 4 or up to 8 plots per page. The user can scroll through plots in the plot group, print the plot group, etc . . . .

The plot session 128 is a separate component that manages a collection of plot groups and provides a common forum or central command object for plot groups to communicate together and directs actions such as synchronizing cursors.

The plot session manager object 131 is just another layer that serves as a manager for plot sessions.

Figure 19:
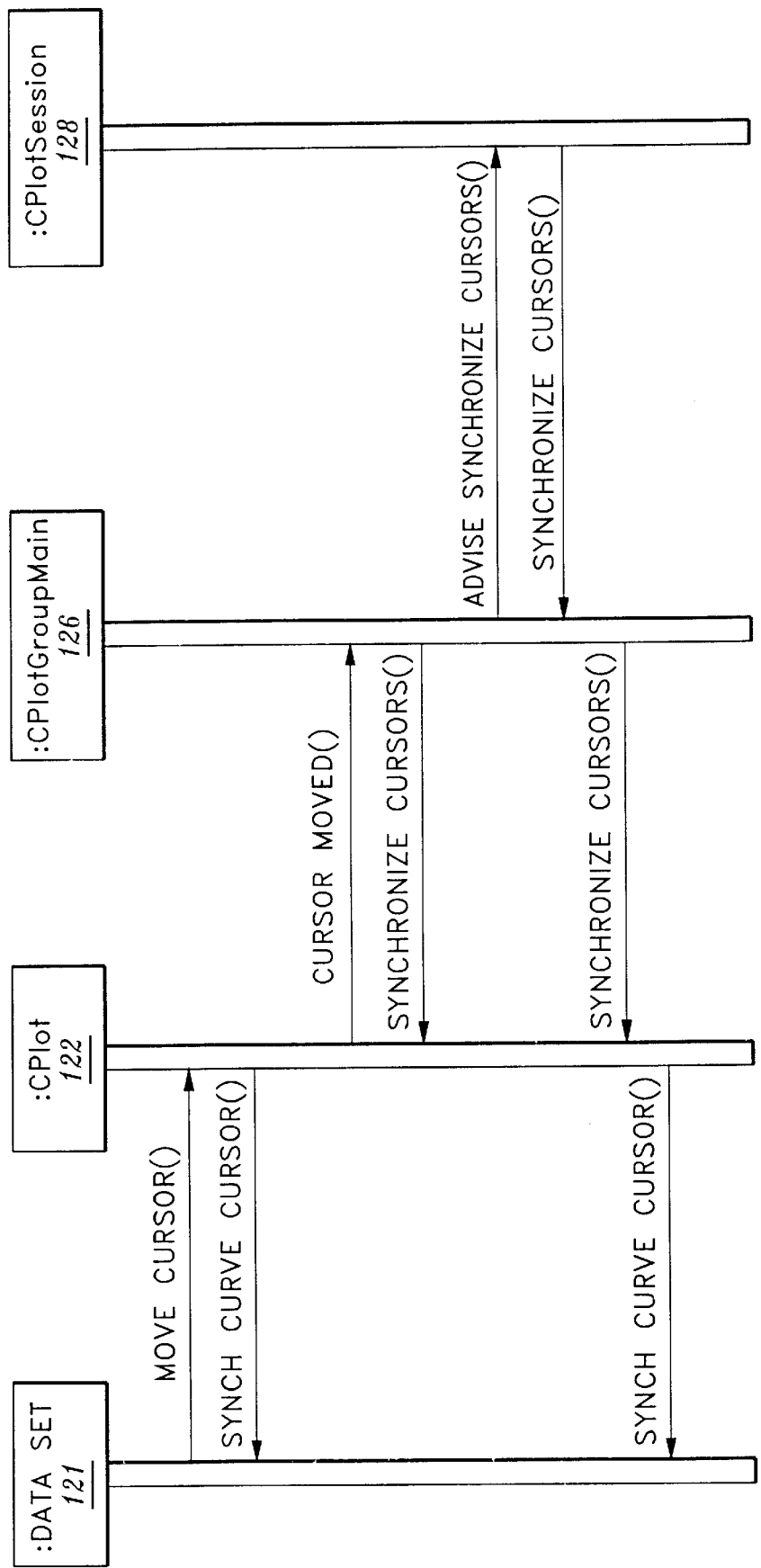
FIG. 19 is a flow diagram of the synchronize cursor method according to the instant invention.

The interaction of cursor synchronization will now be explored by following the arrows shown in FIG. 19 from left to right and from top to bottom. Each plot contains multiple (one or more) curves. If the user moves a cursor in a given plot—the plot first will synchronize the cursors contained in a single plot. Next, the plot forwards a message to the plot group that the user has moved the cursor. The plot group then sends a message to all it's plots to synchronize cursors, then forwards a message to its plot session. The plot session then turns around and repeats the message to all plot groups. Plots groups that have elected to join inter plot group synchronization will then send a message to all their plots to synchronize cursors, and each of those plots will synchronize cursors for all curves.

Configuration Module

Figure 16:
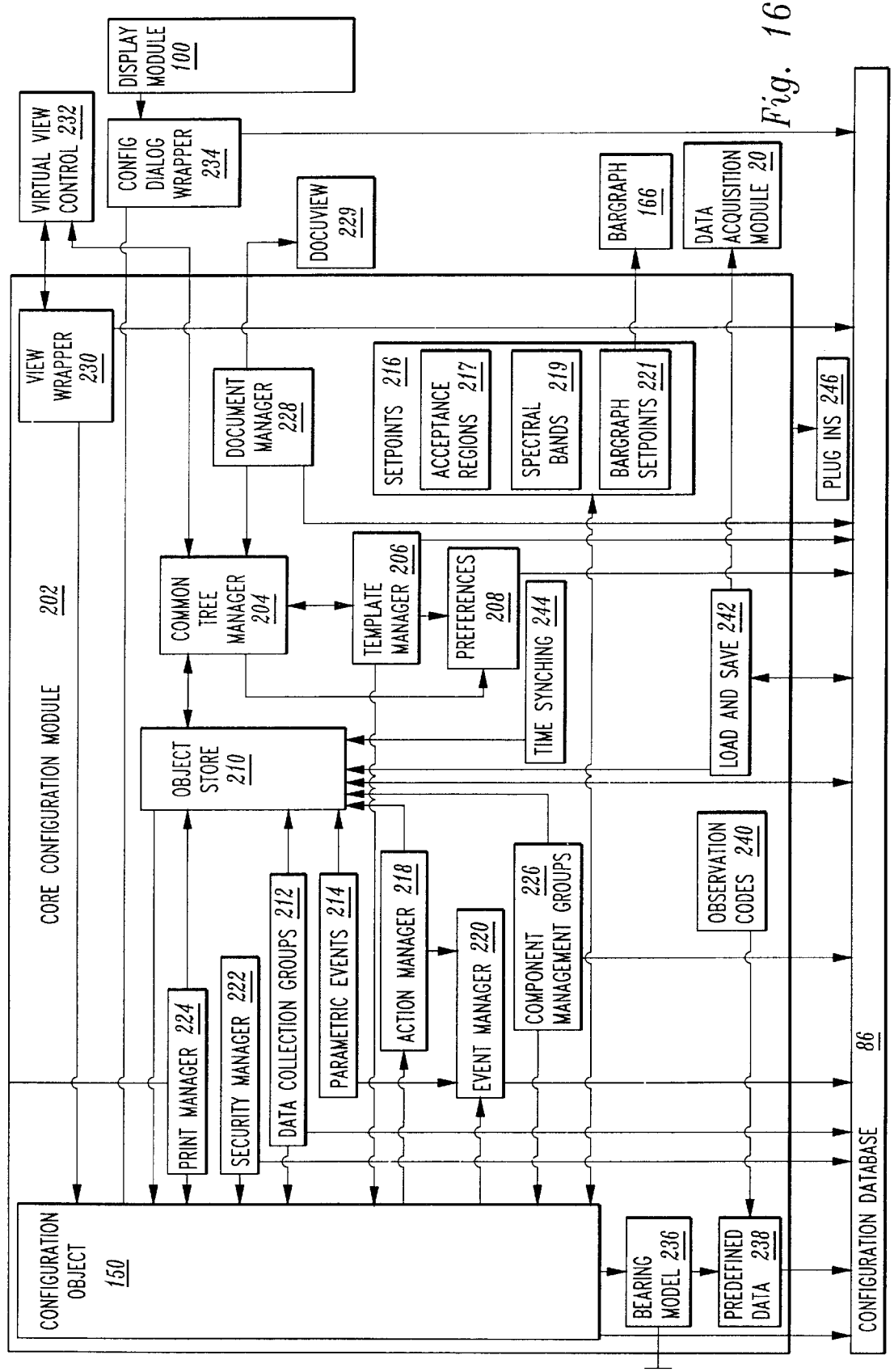
FIG. 16 is a schematic view of, inter alia, a configuration module according to the instant invention.
Figure 17:
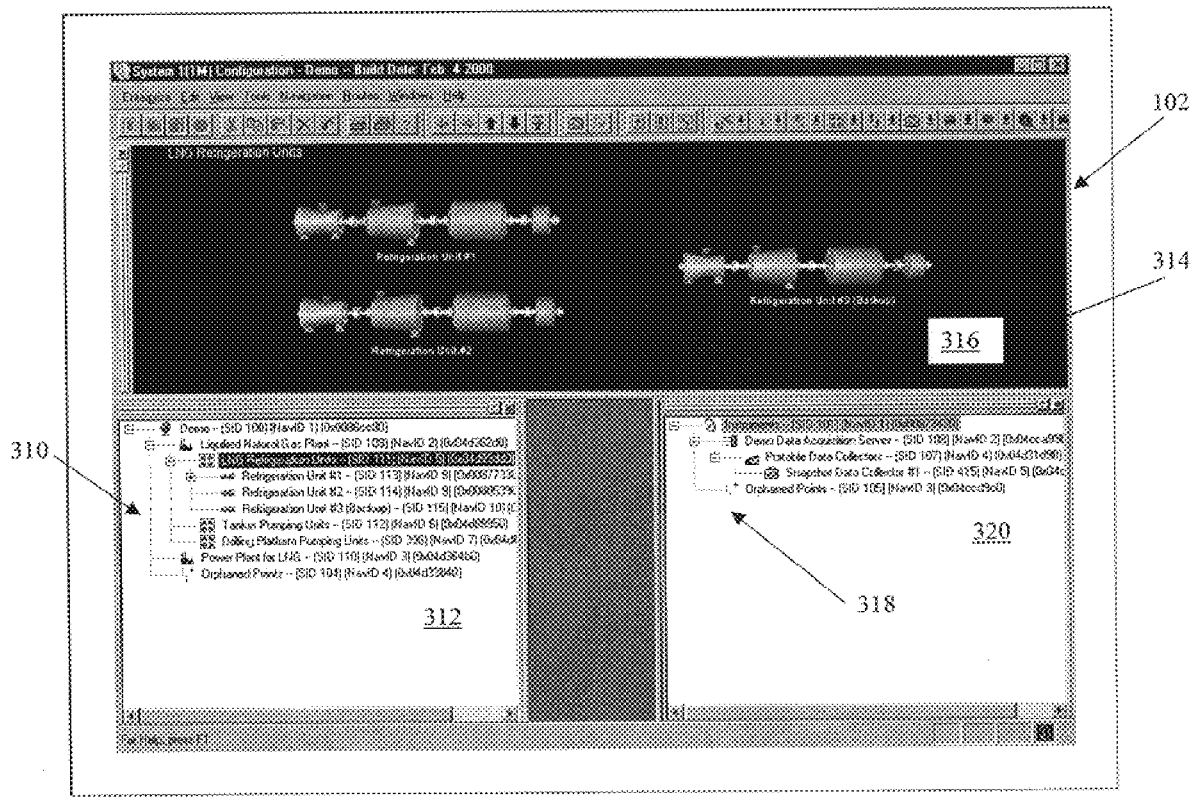
FIG. 17 a screenshot view illustrating views of the unified graphical user interface including a configuration hierarchical enterprise explorer view, a configuration enterprise graphical view and a configuration instrument graphical view employed when configuring an enterprise.
Figure 18:
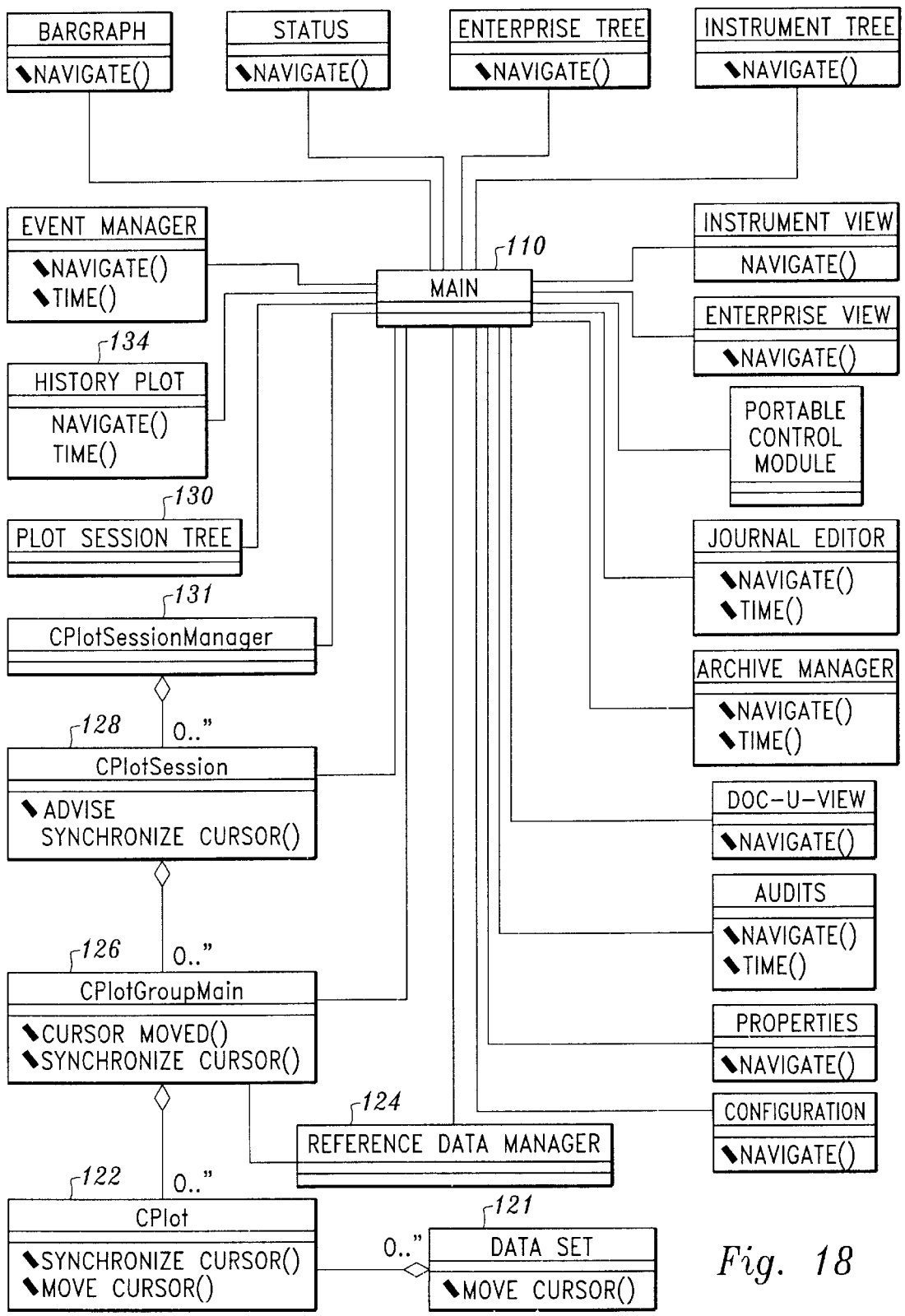
FIG. 18 is a flowchart view of object architecture of the display and configuration modules shown in FIG. 6, and further detailing various plot objects according to the instant invention.

Referring now to FIGS. 16 and 17, and as mentioned hereinabove, the utilities module 200 includes a configuration module 202 that will now be described in the light of the above delineation of the display module 100. The configuration module is a key module in the utilities module 200 and it can be sequestered into a stand-alone primary module that resides one or more servers $S_N$, on one or more data acquisition nodes or computers $DAC_1$, $DAC_2$, . . . $DAC_N$, and/or on one or more display clients or computers $DC_1$, $DC_2$, . . . $DC_N$. The configuration module 202 includes the configuration object 150 and is operatively coupled to the configuration database 86 (the repository for all configuration properties for the system 10). The configuration object 150 handles displaying, editing and validating configuration data for any node in a configuration tree. The configuration object 150 also reads and writes this data to the configuration database 86.

The configuration module 202 of the system 10 is a software module that allows users to configure the actual plant layout and the associated physical assets including the physical appearance of each asset or machine. Similar to the display module 100, the configuration module 200 presents, via the unified graphical user interface 102, a configuration explorer view 310 in an explorer view window 312, a configuration graphical view 314 in a graphical window 316 and a configuration instrument view 318 in a instrument view window 320. As noted supra, when the user navigates through the system each view is linked. For instance, if the user clicks through the configuration explorer view 310, the configuration graphical view 314 in the graphical window 316 follows the navigation although the user is not directly interfacing with window 316.

The user can configure an enterprise via the configuration explorer view or the configuration graphical view. As users configure their graphical view 314, the explorer view 310 is automatically populated and vise versa. Similarly, the user configures their instrumentation systems via the configuration instrument view 318.

Users are allowed to configure properties for each of their assets. This includes information such as: serial numbers, manufacturer and model number, machine specifications, process information, linking to manuals and engineering drawings, maintenance history and photographs. These views preferably appear as dialogue boxes that can be accessed by selecting the asset to be configured and then selecting properties on a pop up menu similar to that shown in FIG. 10.

At the outset, the user creates a new enterprise by interacting with the unified graphical user interface 102. For example, and referring to FIG. 17, the user can create an enterprise node named Plant A by using the file menu located on the top toolbar. When the user creates an enterprise the configuration module 202 communicates with one or more servers $S_N$ and builds a database for this enterprise node in one or more configuration databases 86. The enterprise configuration can cooperate with one or more data acquisition computers $DAC_N$ and thus, with a plurality of data acquisition devices 60 and describes the data collection process and the instrumentation connected to the data acquisition computers $DAC_N$. Next, the user starts populating this enterprise with machine assets by selecting the enterprise node and using menus and dialog boxes. For example, the user may populate the enterprise with, inter alia, turbines, pumps, couplings et cetera. Preferably, the user can associate each asset or node in the enterprise with a name and with a tag. Next, each machine asset can be populated with instrumentation assets by using menus, which associate further assets to the selected machine asset, and by using dialog boxes which allow the user to associate properties with the particular asset selected from the menu. In turn, menus and dialog boxes can be used to populate the instrumentation assets with transducer/sensor assets which may be associated with one another. For example, a timing transducer or phase reference transducer may be associated with a proximity transducer for obtaining 1×waveforms by selecting each asset and using an association selection on a menu or dialog box provided by the configuration module 202. Measurement points or transducer/sensors 70 can also be associated with one another to present, for example, specific plot presentations like an orbit plot. Furthermore, process information from transducer/sensors 70 can be associated with, for example, vibration information from transducer/sensors 70 for presenting both process information and machine monitoring information.

The asset specifications including asset properties are preprogrammed into the system 10 or appended to the system 10 via for example, external database 304. Preferably, the specifications are obtained by the OEMs (Original Equipment Manufacturers), historical information, nameplate information, et cetera.

The configuration module 202 maintains the historical configuration of an asset and previous versions of the configuration can be restored. In addition, module 202 can maintain the ability for the user to view data for points whose properties have changed, or that have been deleted.

More specifically, and referring to FIG. 16, several features are included in the configuration module 202 that make it easier for the user to configure the system 10. For example, the configuration module 202 includes a common tree manager module 204 that controls the viewing and editing of trees. This includes cut, copy, and paste functions, drag and drop functions, adding components, and deleting components in the trees. The paste functionality includes the ability to paste multiple copies at once, e.g., pasting three copies of a transducer channel pair.

Additionally, a template manager 206 allows a user to add pre-configured components to an enterprise being configured. It also allows the user to create custom pre-configured components to be used by the system 10. For example, a user may have five identical trains in a plant. Each of these trains has identical properties. The user can save the configuration for one of these trains as a template. This template can then be added to the system numerous times in order to configure the additional trains.

Thus, the template manager 206 handles the adding and saving of tree components, and their properties, as templates. The user can then use these templates to add new pre-configured components to their configuration hierarchy.

A preference module 208 is interfaced between the common tree manager 204 and the configuration database 86 for providing the user with configuration of various preferences for the interface 102.

The configuration module 202 further includes an object store module 210 that provides interface pointers to the configuration objects, creates configuration objects and destroys configuration objects. This is the common interface for trees to communicate with one another. Additionally, object store module 210 builds the icon list that the trees and template toolbars use.

A data collection groups module 212 is interfaced between the configuration object 150, the configuration database 86 and the object store module 210 for providing the configuration of data collection groups. This allows the user to group a set of points together for the purpose of taking specific actions on all members of that group. For example, measurement locations can be grouped into a set of collection groups and if one location in the collection group goes into alarm, data collection can occur for all points in that group. Collection groups can also be enabled based on events other than alarms. Locations in one group are not restricted to belonging to one train. They can span multiple trains.

A parametric events module 214 provides dialogs for displaying and creating parametric events. Parametric events allow the user to group different individual events including alarms using Boolean logic. When the conditions of the Boolean equation are met, module 214 can be used to drive a specific action. This allows the user to configure an action based on one or more events occurring. For example, if a speed exceeds 3600 rpm and the time is 9:00 a.m., then enable a set point.

Setpoints module 216 provides dialogs for displaying and editing, inter alia, acceptance regions 217, spectral bands 219 and bargraph setpoints 221. The graphical user interface 102 in combination with the configuration module 202 allows the user to view data when setting set points.

Action manager module 218 provides dialogs for creating and displaying configured actions. Additionally, an event manager module 220 interfaces to the database 82 for obtaining and displaying setpoints, spectral bands, acceptance regions, actions, and parametric events. Furthermore, a security manager module 222 provides configuration security settings for the system 10. Security is configured based on the logged-in user and certain tasks, such as editing set points or acknowledging events. Security settings can also be based on the particular instrumentation. For example, a user can be given access to edit the configuration for a portable system, but not for an on-line system. Moreover, a print manager module 224 provides for configuring printer settings, and printing of all configuration reports.

Component Management Groups module 226 is interfaced between the configuration object 150, the configuration database 86 and the object store module 210 for allowing the user to easily change properties for a set of similar assets. The user may have ten identical machines. Some of the properties for these machines may have been incorrectly configured. If the machines are part of a component management group, the user can correct the configuration in one place thereby resulting in all components of that group being automatically updated.

A document manager module 228 provides the configuration interface to the document view 229 presented by the document object 138. View wrapper module 230 provides a window that contains the virtual view, and the database interface to the virtual view for the configuration module 202. The virtual view control module 232 cooperates with the view wrapper module 230 to provide virtual view control. Configuration dialog wrapper module 234 provides the interface for displaying and editing of configuration data for the display module 100.

The configuration module 202 can include predefined asset models. For example, bearing module 236 can be included which provides for the configuration of bearing components and can include a predefined database. In addition to direct user input, the bearing module 236 can also retrieve information from a third-party bearing database package.

Predefined data module 238 provides an interface to the database for commonly used data. The predefined data module 238 is operatively coupled to an observation codes module 240 that provides for the configuration of user-defined observation codes. An observation code can be used as a source of data for configured components. It is a text description of a condition that a user may observe while collecting data.

A load and save module 242 interfaces between the configuration database 86 and both the object store 210 and the data acquisition module 20 for handling the locking, opening and closing of the configuration database 86. The load and save module 222 can also include a change log that lists the changes made during the configuration session, as well as the logged-in user who made them. Additionally, the load and save module 242 handles final save and cleanup of the configuration database 86.

A time synching module 244 creates a time synchronization event for synchronization of the data acquisition modules 20.

Finally, an external plug Ins module 246 can be included for containing all the functionality for configuration of hardware-specific nodes. Each hardware device can be supported by a separate plug-in. This allows for configuration support of additional hardware devices, with minimal impact on the core configuration module 202.

In summary, the industrial plant asset management system 10 includes a synchronized multiple view graphical user interface with real time and database interfaces, different configurations for different users and different types of users, a relational database with input and output interfaces and preferably, a knowledge manager as exemplified by U.S. Pat. No. 5,905,989 which is hereby incorporated by reference in its entirety, a normalizing data acquisition element with real time and data base interfaces, a variety of device dependant Data collector modules with associated signal conditioning and processing means for connecting to a variety of asset management instruments (e.g., a 3500 Monitoring System manufactured by Bently Nevada Corporation located in Minden, Nev.) that are then connected to a variety of asset management transducers including vibration, temperature, pressure, flow, optical, torque, position, and others. The system 10 further connects third party instrumentation systems, monitoring systems, machine controllers, process controllers, and field devices.

In use and operation, and referring to the drawings, the display module 100 includes the unified graphical user interface 102 that allows users to view assets objects or asset representations through a variety of different window views and while the user navigates through the system 10 each view is linked. For instance and as detailed supra, if the user clicks through the enterprise explorer tree view 152, the enterprise graphical view 160 follows the navigation although the user is not directly interfacing with the graphical view 160 or the graphical window 162. This linked view may be driven by the user or by alarms. Because all views are linked exploring root cause of alarm is rapid—simply clicking the selection device results in the user seeing the asset where the alarm is and the instrumentation that generated it. Additionally, the display module 100 of the system 10 is sensitive to the user, as it allows the presentation of different views to machine maintenance specialists, machine operators, or instrument technicians.

In one preferred form, the instant invention includes a plurality of different views. For example, the system 10 can display a diagnostic view, an operator view, an instrument view or a user customized view which is basically a view that a user creates and saves so that it can be recalled at any future time. Referring to FIG. 7, the diagnostic view simultaneously displays, via the graphical user interface 102, the enterprise explorer window view 154 showing the hierarchical enterprise tree view of enterprises including a hierarchical view of asset objects or asset representations, the enterprise graphical window view 162 showing virtual views of two and three-dimensional asset objects or asset representations, and the plot session tree view 260 or in the alternative, the current value(s)/history window view 168 showing real-time asset objects or asset representations in the form of bargraphs or trend plots. The operator view may simultaneously display the enterprise explorer window view 154 and the current value(s)/history window view 168 on the graphical user interface 102. The instrument view simultaneously displays the instrument explorer window view 172 including a hierarchical view of instrument asset objects or asset representation and the instrument graphical window view 176 including virtual views of two and three-dimensional instrument asset objects or asset representations (please see FIG. 9). Preferably, all of these windows can be repositioned and docked anywhere on the interface 102.

At the highest level, the diagnostic view can display an object model of the unit(s) (process train or machine train) in the enterprise graphical window view 162 that is correlative to the highlighted enterprise(s) in the plant explorer view 154. For example, an enterprise asset can be that of a power generation plant having a machine train named unit one. The enterprise graphical window view 162 or virtual window view would then include a display of unit one when the associated power generation plant is highlighted in the enterprise or plant explorer window view 154. At the highest level, the plot session tree view 260 can include plot sessions or in the alternative, the current value(s)/history view 168 can include data on the highlighted enterprise.

Placing a pointer on an explorer asset object or asset representation in the enterprise explorer window view 154 and selecting that object by performing, for example, a single left click of the mouse 114 results in that object being highlighted and synchronously displays an associated virtual object in the enterprise graphical window view 162. Actuating the pointer on any explorer icon or object in the enterprise explorer window view 154 by performing, for example, a double left click of the mouse 114 results in that object being opened or expanded into further objects and a plus sign that is disposed next to the object converts to a minus sign. Additionally, this actuation may also results in a synchronous change of display of an associated virtual object in the enterprise graphical window view 162. Furthermore, actuating the pointer on any plus or minus sign by performing, for example, a single left click of the mouse 114 results in that object being respectively opened (expanded) or closed (compressed) and may be synchronously followed by the display of an associated virtual object in the enterprise graphical window view 162.

For example, selecting the explorer power generation plant object by performing, for example, a single left click of the mouse 114 reveals a machine train named unit one in the enterprise graphical window view 162. Actuating the pointer on the explorer power generation plant object by, for example, performing a double left click of the mouse 114, results in that object being opened or expanded to reveal object units of the actuated object and a plus sign that is disposed next to the object converts to a minus sign. The pointer can then be positioned on unit one and the user can actuate the pointer on unit one by, for example, performing a double left click of the mouse 114, to reveal an asset object or an asset object group associated with unit one (e.g., the 300 MW TG asset). Similarly, actuating a particular asset object group shows the individual asset objects of that group and actuating any individual asset, for example, the 300 MW TG asset drills down or expands the asset into one or more instrument asset objects which in turn can be actuated to expand the instrument asset into one or more monitoring transducers/sensors asset objects. Actuating the pointer on transducers/sensors objects reveals the type of data that may be engendered therefrom.

When drilling down the hierarchical enterprise explorer tree 152 by actuating the pointer on any asset object (e.g., an explorer plant object or unit object) or by, for example, double left clicking the object or single left clicking the plus sign, when associated with a selected object, results in a synchronous display in the enterprise graphical window view 162 of one or more virtual asset objects correlative to the selected asset object such as the explorer plant object or unit object. Additionally, the current value(s)/history view 168 synchronously follows the other two windows for revealing real-time bargraph views and trend plots for assets. Furthermore, visual feedback of alarms including severity levels displayed in one window synchronously follows the other windows. Thus, visual feedback of a particular severity level highlighting of the plant object, unit object, or any other asset object in the enterprise graphical window view 162 synchronously follows the particular severity level highlighting of the plant object, unit object, or any other asset object in the hierarchical enterprise explorer tree 152. Moreover, the user can follow the severity level highlighting (e.g., a user configurable color as delineated supra) as the user opens assets objects or drills down the enterprise via either view for pinpointing the cause of the alarm.

It should be noted that depending on what or where the user is at in the tree—clicking the plus or minus signs or boxes next to node, may or may not drive a navigation broadcast. The model can easily be explained with example. The basic rule is that, if pressing the plus or minus changes the "selection" (what node has highlight)—then that is where the user navigate to, else the user stays put on whatever node is currently highlighted.

For example, if the user has a node that is opened up and the user clicks on the plus or minus box this does not drive any navigation—if the user were to also drill down on the tree by just clicking on the plus signs, while the top most parent node is still selected, this also would not drive any navigation—since the top most node remains selected. Navigation is only driven when the user actually selects or changes a node (highlights it). Another example is that if the user selects on a child node way deep in the tree, when the user presses the minus sign node the tree collapses back to the root node, and the root node becomes selected. This would drive a navigation as the root node now becomes selected.

Actuating the pointer on any one particular asset object in the enterprise graphical window view 162 by, for example, performing a double left click causes that object to be expanded to one or more assets which are displayed in the enterprise graphical window view 162 as two or three-dimensional objects. In synchrony, the objects in the explorer view, which are associated with the objects selected in the graphical window view 162, are automatically expanded. Thus, the enterprise graphical window view 162 can be used to drill down from a unit asset object to asset object groups and then down to a particular asset object including associated monitoring transducer/sensor objects. As the user drills down the enterprise via the graphical window view 162 the explorer window view 154 synchronously. follows by expanding the objects in the explorer window view 154 that where selected in the graphical window view 162. Moreover, and as mentioned above, the user can follow a course of alarm severity level color highlighting by drilling down the enterprise and following the color highlighting via the graphical window view for pinpointing the cause of the alarm.

Referring to FIG. 9, the instrument explorer window view 172 and the instrument graphical window view 176 are also linked and work analogous to the enterprise explorer window view 154 and the enterprise graphical window view 162, respectively. Thus, selecting an instrument asset object or asset representation in the instrument explorer window view 172 results in that instrument being depicted via two or three-dimensional objects in the instrument graphical window view 176. Additionally, actuating an instrument in the instrument explorer window view 172 by, for example, performing a double left click causes that instrument object to be expanded into one or more instrument asset objects which in turn can be expanded into transducer/sensor asset objects associated with each instrument. The instrument graphical window view 176 synchronously follows the instrument explorer window view 172 and the selected or actuated instrument in explorer window view 172 is displayed in the instrument graphical window view 176 via two and/or three-dimensional asset objects or asset representations. Conversely, the instrument explorer window view 172 synchronously follows the instrument graphical window view 176. Thus, selected or actuated two and/or three-dimensional instrument asset objects in the graphical window view 176 cause respectively, the selection of instrument objects or the expansion of instrument objects in the explorer window view 172.

Furthermore, the instrument explorer window view 172 and the instrument graphical window view 176 also include visual feedback of alarms including severity levels for each window, which synchronously follow the other window. Thus, the user can follow severity level highlighting (e.g., a user configurable color as delineated supra) as the user drills down the enterprise via either the instrument explorer window view 172 or the instrument graphical window view 176 for pinpointing the cause of the alarm.

The graphical interface 102 (GUI) of the systems 10 preferably further includes a title bar extending along an upper most periphery of the window followed by an elongated menu bar, an elongated tool bar and an address bar. The title bar can include the title of the main window or the title of a selected object. The menu bar can include nomenclature (e.g., File, View, Edit, Window and Help) associated with a plurality of drop down menus. The elongated tool bar can include plot toolbars as delineated supra. The address bar can show a current address of a remote site. For example, the address bar may show a Universal Resource locator (URL) for addressing a web site on the World Wide Web.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A plant asset management system, comprising in combination:

a processing device, a display device coupled to said processing device for providing a graphical user interface to a user in response to receipt of signals from said processing device, a selection device coupled to said processing device for navigating about said graphical user interface and making selections, said graphical user interface including a first view in a first window and a second view in a second window both displayed on said display device;

means for linking said first view in said first window with said second view in said second window for synchronizing said two views together to simultaneously display a hierarchical view of plant locations in said first view and a corresponding two or three dimensional view modeling at last one of said plant locations in said second view;

means for graphically navigating through said plant locations in either one of said two views by making a selection with said selection device of at least one of said plant locations in either one of said two views, and means for synchronously changing said two views in response to making said selection in either one of said two views for simultaneously displaying both a hierarchical view of plant locations including said selected plant location in said first view and a corresponding two or three dimensional view modeling at least said selected plant location in said second view such that said two views synchronously navigate together in response to making said selection in either one of said two views for managing plant assets.

2. The plant asset management system of claim 1 further including means for synchronously expanding at least one of said plant locations in both of said two views into one or more further plant locations by actuating said at least one of said plant locations in either one of said two views.

3. The plant asset management system of claim 2 wherein said plant locations are comprised of object assets, instrument assets and knowledge assets.

4. A plant asset management system, comprising in combination:
   a plurality of sensors operatively coupled to plant assets including machinery for sensing asset data;
   data acquisition means operatively coupled to said plurality of sensors for receiving and processing said asset data,
   a database associated with said data acquisition means for storing said processed asset data;
   a graphical user interface operatively coupled to both said data acquisition means and said database and displayed on a display of a computer;
   a selection device operatively coupled to said computer for navigating about said graphical user interface;
   said graphical user interface including a hierarchical first view of a plurality of said plant assets displayed in a first window on said display of said computer and a two or three dimensional second view modeling at last one of said plant assets and displayed in a second window on said display of said computer;
   means for linking said hierarchical first view with said two or three dimensional second view for synchronizing said first and second views together to simultaneously display both said hierarchical first view of plant assets in said first window and said two or three dimensional second view modeling at last one of said plant assets in said second window;
   means for graphically navigating through said plant assets in either one of said first and second views by making a selection with said selection device of at least one of said plant assets in either one of said first and second views;
   said graphical user interface further including a third view comprised of at least one plot displayed in a third window on said display of said computer, and
   means for synchronously changing said first view, said second view and said third view in response to making said selection in either one of said first and second views for simultaneously displaying a hierarchical first view of plant assets including said selected plant asset in said first window, a corresponding two or three dimensional second view modeling at least said selected plant asset in said second window and a corresponding third view comprised of at least one plot plotting asset data associated with said selected plant asset such that said first, second, and third views synchronously navigate together in response to making said selection in either one of said first and second views for managing plant assets.

5. The plant asset management system of claim 4 wherein said linking means includes a first object that receives navigation commands from a second object and transmits navigation commands to a third object for synchronously linking said first view with said second view so that said selection by said selection device of said one of said plurality of plant assets in either one of said first and second views results in said simultaneous display of said hierarchical first view of plant assets including said selected plant asset in said first window and said corresponding two or three dimensional second view modeling at least said selected plant asset in said second window.

6. The plant asset management system of claim 4 further including a fourth view of said graphical user interface that is synchronously linked with said first view for displaying a bargraph view graphically displaying a plurality of bargraphs wherein at least one of said bargraphs is representative of the status of said selected plant asset.

7. The plant asset management system of claim 4 further including a fourth view of said graphical user interface that is synchronously linked with said first view for displaying a trend plot of at least said selected plant asset.

8. The plant asset management system of claim 4 wherein said processed asset data of at least said selected plant asset is displayed as one or more graphical plots in said third view of said graphical user interface.

9. A method of managing plant assets, the step including:
   collecting and processing asset data from a plurality of measurement devices operatively coupled to plant assets including machinery;
   storing said processed asset data on a storage medium;
   interfacing with said storage medium via a computer means having a graphical user interface;
   displaying on said graphical user interface a hierarchical object first view including hierarchical objects representative of said plant assets;
   displaying on said graphical user interface a graphical object second view including graphical objects representative of said plant assets;
   interfacing with at least one of said objects displayed in either one of said first and second views;
   synchronizing said graphical object first view with said hierarchical object second view for synchronously changing said first and second views in response to interfacing with said at least one of said objects displayed in either one of said first and second views for simultaneously displaying said hierarchical object first view including said at least one of said objects being interfaced with and said graphical object second view modeling said at least one of said objects being interfaced with such that said first and second views synchronously navigate together in response to interfacing with said at least one of said objects displayed in either one of said first and second views, and
   accessing and displaying on said graphical user interface at least a portion of said processed asset data associated with said at least one of said objects interfaced with in either one of said first or second views for managing at least one of said plant assets represented by said at least one of said objects interfaced with in either one of said first or second views.

10. A plant asset management system, comprising in combination:
   data acquisition means operatively coupled to plant assets for receiving and processing asset data from said plant assets;
   a database operatively coupled to said data acquisition means for storing said processed asset data;
   a graphical user interface operatively coupled to said database and displayed on a display of a computer;
   a first window view of plant asset objects hierarchically displayed on said graphical user interface and representing said plant assets;
   means for correlating said processed data to said plant asset objects;
   means for configuring alarm parameters for said plant assets and storing said parameters in said database;
   means for applying said alarm parameters to said processed data correlated to said plant asset objects for determining plant assets in alarm;

means for providing visual colored feedback of at least one of said plant assets in alarm by color highlighting each of said plant asset objects associated with said at least one of said plant assets in alarm, and means for navigating through said hierarchically displayed plant asset objects to a plant asset object representative of said at least one of said plant assets in alarm by iteratively expanding said color highlighted plant asset objects such that said visual colored feedback is followed to said plant asset object representative of said at least one of said plant assets in alarm.

11. The plant asset management system of claim 10 further including means for defining severity levels for said alarm parameters and means for associating different colors to different severity levels such that said color highlighted plant asset objects associated with said at least one of said plant assets in alarm are color coded based on said defined severity levels for said alarm parameters.

12. The plant asset management system of claim 10 further including means for defining a plurality of different setpoint values and for defining severity levels for each of said plurality of different setpoint values.

13. The plant asset management system of claim 12 further including means for defining a particular color to each of said plurality of different severity levels.

14. The plant asset management system of claim 13 further including means for applying said plurality of different setpoint values to said asset data for determining if any asset data exceeds said plurality of different setpoint values and further including means for providing visual feedback to said user via said graphical user interface that is correlative to each of said severity levels colors for asset data exceeding each of said plurality of setpoint values.

15. A plant asset management system, comprising in combination:
   a data acquisition computer operatively coupled to a plurality of plant assets for receiving and processing asset data,
   a database operatively coupled to said data acquisition computer for storing said processed asset data;
   a graphical user interface operatively coupled to said database and displayed on a display of a computer;
   said graphical user interface displaying a plurality of plant asset objects in a first widow view representative of said plurality of plant assets;
   means for interfacing with said plurality of plant asset objects for accessing said processed asset data from said database;
   means for displaying a plurality of data sets of said accessed data on said graphical user interface, each data set including a cursor displayed there with;
   means for synchronizing one cursor in one of said plurality of data sets with another cursor in another of said plurality of data sets so that movement of said one cursor to a first parameter in said one of said plurality of data sets automatically results in synchronously driving said another cursor to a second parameter in said another of said plurality of data sets which is correlative to said first parameter.

16. The plant asset management system of claim 13 wherein said plurality of data sets are graphical plots of said accessed data.

17. The plant asset management system of claim 15 wherein said first parameter and said second parameter are sample parameters.

18. The plant asset management system of claim 15 wherein said first parameter and said second parameter are time parameters.

19. The plant asset management system of claim 15 wherein said first parameter and said second parameter are RPM parameters.

20. A plant asset management system, comprising in combination:
   a data acquisition computer operatively coupled to a plurality of plant assets for receiving and processing asset data,
   a database operatively coupled to said data acquisition computer for storing said processed asset data;
   a graphical user interface operatively coupled to said database and displayed on a display of a computer;
   said graphical user interface displaying a plurality of plant asset objects in a first widow view representative of said plurality of plant assets;
   means for interfacing with said plurality of plant asset objects for accessing said processed asset data from said database;
   means for displaying a first graphical plot of said accessed data on said graphical user interface and storing said plot in said database;
   means for displaying subsequent graphical plots of said accessed data on said graphical user interface and storing said subsequent graphical plots in said database for defining a plot session viewable at a later time.

21. The plant asset management system of claim 20 further including means for displaying a graphical map of said plot sessions and plots therein in a second window view on said graphical user interface simultaneously with displaying said plurality of plant asset objects in said first widow view.

22. The plant asset management system of claim 20 wherein said first graphical plot includes a plurality of individual plots defining a plot group.

23. The plant asset management system of claim 20 wherein at least one of said subsequent graphical plots include a plurality of individual plots for defining a plot group.

24. The plant asset management system of claim 20 wherein said first graphical plot and at least one of said subsequent graphical plots include a plurality of individual plots for defining a plurality of plot groups.

25. A method of managing plant assets, the steps including:
   obtaining visual colored feedback from at least one object in a hierarchy of objects displayed on a graphical user interface, said visual colored feedback being correlative to an anomalous asset status;
   navigating through said hierarchy of objects displayed on said graphical user interface by successively expanding objects in said hierarchy of objects that provide said visual colored feedback for determining causation of the anomalous asset status.

26. A plant asset management system, comprising in combination:
   a plurality of transducers operatively coupled to plant assets for sensing plant asset data;
   a plurality of different data acquisition devices including both online and offline data acquisition devices, each said different data acquisition device operatively coupled to at least one of said transducers for processing said sensed plant asset data;
   a plurality of data collector modules each operatively coupled to at least one of said different data acquisition devices for collecting plant asset data from said different data acquisition devices;

a database operatively coupled to said data collector modules for storing said collected plant asset data;

a graphical user interface operatively coupled to said database and including a hierarchical first view of a plurality of said plant assets displayed in a first window on a display of a computer and a two or three dimensional second view modeling at last one of said plant assets and displayed in a second window on said display of said computer;

a selection device operatively coupled to said computer for navigating about said graphical user interface;

means for linking said hierarchical first view with said two or three dimensional second view for synchronizing said first and second views together to simultaneously display said hierarchical first view of said plurality of said plant assets in said first window and said two or three dimensional second view modeling at least one of said plurality of said plant assets in said second window;

means for graphically navigating through said plant assets in either one of said first and second views by making a selection with said selection device of at least one of said plant assets in either one of said first and second views;

means for synchronously changing said first view and said second view in response to making said selection in either one of said first and second views for simultaneously displaying said hierarchical first view of plant assets including said selected plant asset in said first window and said two or three dimensional second view modeling at least said selected plant asset in said second window such that said first and second views synchronously navigate together in response to making said selection in either one of said first and second views;

means for accessing said stored data including both online and offline stored data associated with at least said selected plant asset and in response to making said selection in either one of said first and second views, and means for simultaneously displaying on said graphical user interface said first and second views and at least a portion of said accessed stored data including both online and offline stored data associated with at least said selected plant asset for managing said plant assets.

* * * * *

UNITED STATES PATENT AND TRADEMARK OFFICE
CERTIFICATE OF CORRECTION

PATENT NO. : 6,421,571 B1
DATED : July 16, 2002
INVENTOR(S) : Spriggs et al.

It is certified that error appears in the above-identified patent and that said Letters Patent is hereby corrected as shown below:

<u>Title page,</u>
Item [75], change the Inventors names from:
"Bob Spriggs, Bob Hayashida, Ken Ceglia, Diana Seymour, Mike Peden, Paul Richetta, Rich Bennington, Daryl Frogget, Scott Roby, Mark Jensen" to -- Robert L. Spriggs, Robert D. Hyashida, Kenneth P. Ceglia, Diana L. Seymour, Michael D. Peden, Paul F. Richetta, Matthew D. Anderson, Richard P. Bennington, Daryl R. Frogget, Scott A. Roby, Denmark A. Jensen --
Item [73], Assignee, change the State of Residence of the Assignee from "NE" to -- NV --.

Signed and Sealed this

Sixth Day of January, 2004

JAMES E. ROGAN
*Director of the United States Patent and Trademark Office*